(12) United States Patent
Katayama

(10) Patent No.: US 6,209,987 B1
(45) Date of Patent: Apr. 3, 2001

(54) IMAGE FORMATION METHOD AND IMAGE FORMATION CONTROL SYSTEM

(75) Inventor: Takuya Katayama, Ebina (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 09/014,610

(22) Filed: Jan. 28, 1998

(30) Foreign Application Priority Data

| Jan. 29, 1997 | (JP) | 9-015654 |
| Apr. 9, 1997 | (JP) | 9-090413 |
| Dec. 24, 1997 | (JP) | 9-354639 |

(51) Int. Cl.[7] .................................................. B41J 2/21
(52) U.S. Cl. ............................ 347/43; 347/40; 347/41
(58) Field of Search .................................. 347/43, 40, 41

(56) References Cited

U.S. PATENT DOCUMENTS

| 4,639,746 | * | 1/1987 | Yamamoto . | |
| 5,455,610 | | 10/1995 | Harrington | 347/43 |
| 5,561,500 | * | 10/1996 | Ohzeki et al. | 347/43 |
| 5,583,550 | * | 12/1996 | Hickman et al. | 347/41 |
| 5,600,353 | * | 2/1997 | Hickman et al. | 347/43 |
| 5,692,843 | * | 12/1997 | Furuya | 347/43 |

FOREIGN PATENT DOCUMENTS

| 8-238805 | 9/1996 | (JP) . |
| 8-244256 | 9/1996 | (JP) . |
| 8-336979 | 12/1996 | (JP) . |

* cited by examiner

*Primary Examiner*—N. Le
*Assistant Examiner*—Lamson D. Nguyen
(74) *Attorney, Agent, or Firm*—Oliff & Berridge, PLC

(57) ABSTRACT

A head position management section prereads image data as many lines as the print width of a black head divided by the number of print divisions in a black mode, if the image data is black only, updates the head position, performs vertical scanning control, and instructs an image preparation section to transfer print data as wide as the print width from an image memory to a band buffer. If color data exists at the preread time, a mode change point is set in the line immediately preceding the color data. With the head position set to the mode change point, vertical scanning control is performed and horizontal scanning is repeated at the position as many times as the number of divisions. At the time, the transfer area of print data by the image preparation section is reduced in sequence and the image to the mode change point is completed. Then, the print mode is changed to a color mode and print is continued.

18 Claims, 18 Drawing Sheets

TITLE

XXX ............. X
XXX ............. X
XXX ............. X
XXX ............. X
XXX ............. X
XXX ............. X

---

............. X
XXX ............. X          XXX
XXX ............. X          XXX .............

TABLE G XXX

|         | 1994 | 1995 | 1996 | 1997 | 1998 |
|---------|------|------|------|------|------|
| A COMPANY | 26 | 602 | 90 | 71 | 19 |
| B COMPANY | 56 | 66 | 59 | 89 | 78 |
| C COMPANY | 26 | 29 | 20 | 45 | 49 |
| D COMPANY | 33 | 56 | 9 | 21 | 4 |
| E COMPANY | 55 | 29 | 60 | 8 | 98 |
| F COMPANY | 67 | 59 | 35 | 17 | 67 |

XXX ............. X          XXX ............. X
XXX                          XXX ............. X
                             ............. X
                             ............. X

FIG.14

IMAGE FORMATION METHOD AND IMAGE FORMATION CONTROL SYSTEM

BACKGROUND OF THE INVENTION

This invention relates to an image formation method of a serial printer comprising a color head and a black head placed in parallel each having a plurality of print elements for completing an image by performing the print operation more than once and an image formation control system for controlling the image formation of the serial printer.

FIG. 2 is an illustration to show a schematic configuration of an example of a general serial printer. In the figure, numeral 1 is a carriage drive motor, numeral 2 is a timing belt, numeral 3 is a recording head, numeral 4 is a carriage, numeral 5 is an ink tank, numeral 6 is a carriage guide, numeral 7 is a cable, numeral 8 is recording paper, numeral 9 is a paper feed motor, and numeral 10 is a feed roll. Here, an ink jet printer is shown as a serial printer example.

The carriage 4, which has the recording heads 3 mounted thereon, slides the carriage guides 6 and reciprocates in the horizontal scanning direction of arrow H in the figure. The carriage 4 is moved by the timing belt 2 driven by the carriage drive motor 1. In the example, two recording heads 3 are arranged in the move direction of the carriage 4.

The cable 7 is introduced into the recording heads 3 for supplying power to a heater in the recording heads and transmitting a signal to a drive circuit. The ink tanks 5 are attached to the recording heads 3 for supplying color inks. A plurality of nozzles are placed in each recording head 3 for jetting supplied ink to the recording paper 8 for recording. The recording paper 8 is driven by the feed roll 10 rotated by the paper feed motor 9 in the arrow P direction in the figure for vertical scanning.

A 2-head printer comprising a color head and a black head placed side by side on a carriage in the horizontal scanning direction each head having a plurality of print elements arranged in the vertical scanning direction as a recording head configuration in a serial printer has been developed as shown in FIG. 3, which is a schematic drawing to show an example of recording heads used with the 2-head printer. In FIG. 3, numeral 11 is a color head and numeral 12 is a black head. For example, in an ink jet system, nozzles are arranged in each recording head longitudinally in the figure. The black head 11 performs black recording with all or some of the arranged nozzles.

The nozzles arranged in the color head 12 are separated into groups in response to the number of used ink colors. Here, three color inks of cyan, magenta, and yellow are used and the nozzles for jetting their respective color inks are arranged in line. In FIG. 3, BK denotes black, C denotes cyan, M denotes magenta, and Y denotes yellow. The nozzle groups for jetting different color inks are spaced from each other for preventing colors from being mixed on the head face. Of course, any other color ink may be used.

In such a recording head, the number of nozzles that can print black differs from that of nozzles that can print a color other than black. To use such a recording head for printing, a black image can be printed with the black head width as a unit, thus can be printed at high speed. However, a color image can be printed only with the 1-color width of the nozzles placed in the color head as a unit at the maximum. Normally, once the color mode is set, even a black area is printed only in color image print units. Thus, if an original with color and black areas mixed contains a black area that can be printed at high speed, high-speed print is not performed and the print speed lowers relatively.

To solve such a problem, whether the print object is color or black is determined and the print method is changed in response to whether the image to be printed is color or black, for example, as disclosed in the Unexamined Japanese Patent Application Publication No. Hei 8-238805. Thus, to print an original with color and black areas mixed, a black area is printed at high speed by making full use of the black head width, so that high-speed print is enabled as a whole.

On the other hand, a method of forming an image by horizontally scanning a single area more than once is used as one of recording methods. The number of horizontal scanning times is called the number of print divisions. If the number of print divisions is two, only 50% print is performed by one horizontal scanning, and 100% print is performed by horizontal scanning twice. Paper is fed a half of the 1-color print width of the color head or the whole print width of the black head between the first horizontal scanning and the second horizontal scanning. FIG. 4 is an illustration of an example of a print image formed by horizontal scanning twice; it shows only one color or black and only several dots. First, in print scanning shown in FIG. 4A, image data is thinned out 50% to prepare print data and the print data is printed. Here, assume that the dots indicated by ○ are printed. After the dots are printed, a relative move in the vertical scanning direction is made a half of the print width of the color. In print scanning shown in FIG. 4B, print data of a pattern complementing the dots printed in FIG. 4A is prepared and printed. Here, the dots indicated by × are printed. Then, 100% print is complete as in the area at the middle stage shown in FIG. 4C. Such split print is performed for 100% print by horizontal scanning more than once, whereby misalignment of print scanning joints caused by a paper feed error and dot position misalignment caused by directivity variations in nozzles can be made inconspicuous and adjacent dots printed at the same time can be decreased for lessening bleeding for improving the image quality.

In the Unexamined Japanese Patent Application Publication No. Hei 8-238805, such split print in color mode is described, but such a print method in black mode is not used. To perform such split print in the black mode, the following problem occurs at the mode change time:

FIG. 5 is an illustration of the problem at the mode change time when split print is executed. Here, the number of print divisions is two. In FIG. 5, area A shown on the left is an area that can be printed only in black and area B is an area printed in color. Assume that recording heads exist at the position in the vertical scanning direction shown in (1) in the figure. In the next horizontal scanning, the tips of the heads are moved to line b and horizontal scanning is executed in the state in (2) in the figure. The first horizontal scanning of the area between lines a and b is executed. In this state, horizontal scanning of the area between lines a and b needs to be executed once more. If print is continued intact in the black mode, a relative move of the recording heads is made to the position in the vertical scanning direction shown in (3) in the figure and the second horizontal scanning of the area between lines a and b is executed.

However, at the position shown in (3) in the figure, the top of the area B is exceeded for the color of the color head at the bottom stage in the figure. Thus, if a transition to the color mode is made from the position and an attempt is made to execute color print, the color area between lines b and c (area C) cannot be printed in the color of the color head at the bottom stage in the figure. Thus, when the transition is made from the black mode to the color mode, a blank area as much as the print-impossible area is required.

This also applies when the transition is made from the color mode to the black mode; only one horizontal scanning is executed over the area of a half of the black head width from the end line of the color mode and a desired density cannot be obtained. Thus, a blank area as much as the area is required.

SUMMARY OF THE INVENTION

It is therefore an object of the invention to provide an image formation method and an image formation control system for executing split print for forming an image, thereby improving image quality, moreover requiring no blank area at the change time between modes different in print width, particularly between black and color modes, and not degrading the image quality at the mode change time.

According to the invention, there is provided an image formation method and an image formation control system of a serial printer comprising a plurality of heads placed in a horizontal scanning direction each head having a plurality of print elements arranged on a carriage in a vertical scanning direction for executing horizontal scanning over a single area as many times as the number of print divisions, thereby forming an image, wherein in one print mode, for example, a black mode with a wide print width, image data is preread, if the read image data contains pixels for which the print mode is to be changed, for example, color pixels, a mode change point is set in a predetermined line, and the image to the mode change point is completed by repeating print as many times as the number of print divisions while the print width is reduced at the same position in the vertical scanning direction, then changing the print mode to the color mode, for example, for continuing to print. Thus, if a blank area does not exist in the vicinity of the mode change point, mode change can be made and the image quality is not degraded. The mode change point can be placed in the line immediately preceding the pixels for which the print mode is to be changed (for example, color pixels) or a blank area ahead the line. If the mode change point is placed in a blank area, trouble such as a white stripe occurring in a joint at the mode change time can be prevented and a good image can be provided.

In one print mode, for example, a color mode with a narrow print width, image data is preread, if the read image data does not contain pixels for which the print mode is to be changed, for example, color pixels, a mode change point is set in a predetermined line, and the image to the mode change point is completed, then print is repeated as many times as the number of print divisions while the print width is increased at the same position in the vertical scanning direction, then print is continued in the print mode to which the preceding print mode is changed, such as a black mode. Also in this case, if a blank area does not exist in the vicinity of the mode change point, mode change can be made and the image quality is not degraded. The mode change point can be placed in the line immediately preceding the pixels for which the print mode is to be changed (for example, color pixels) or a blank area behind the line. If the mode change point is placed in a blank area, trouble such as a white stripe occurring in a joint at the mode change time can be prevented and a good image can be provided.

BRIEF DESCRIPTION OF THE DRAWINGS

In the accompanying drawings:

FIG. 13 is an illustration of an example of a color and black mix document;

FIG. 14 is an illustration of another example of a color and black mix document;

DETAILED DESCRIPTION OF THE PREFERRED EMBODIMENTS

Figure 1:
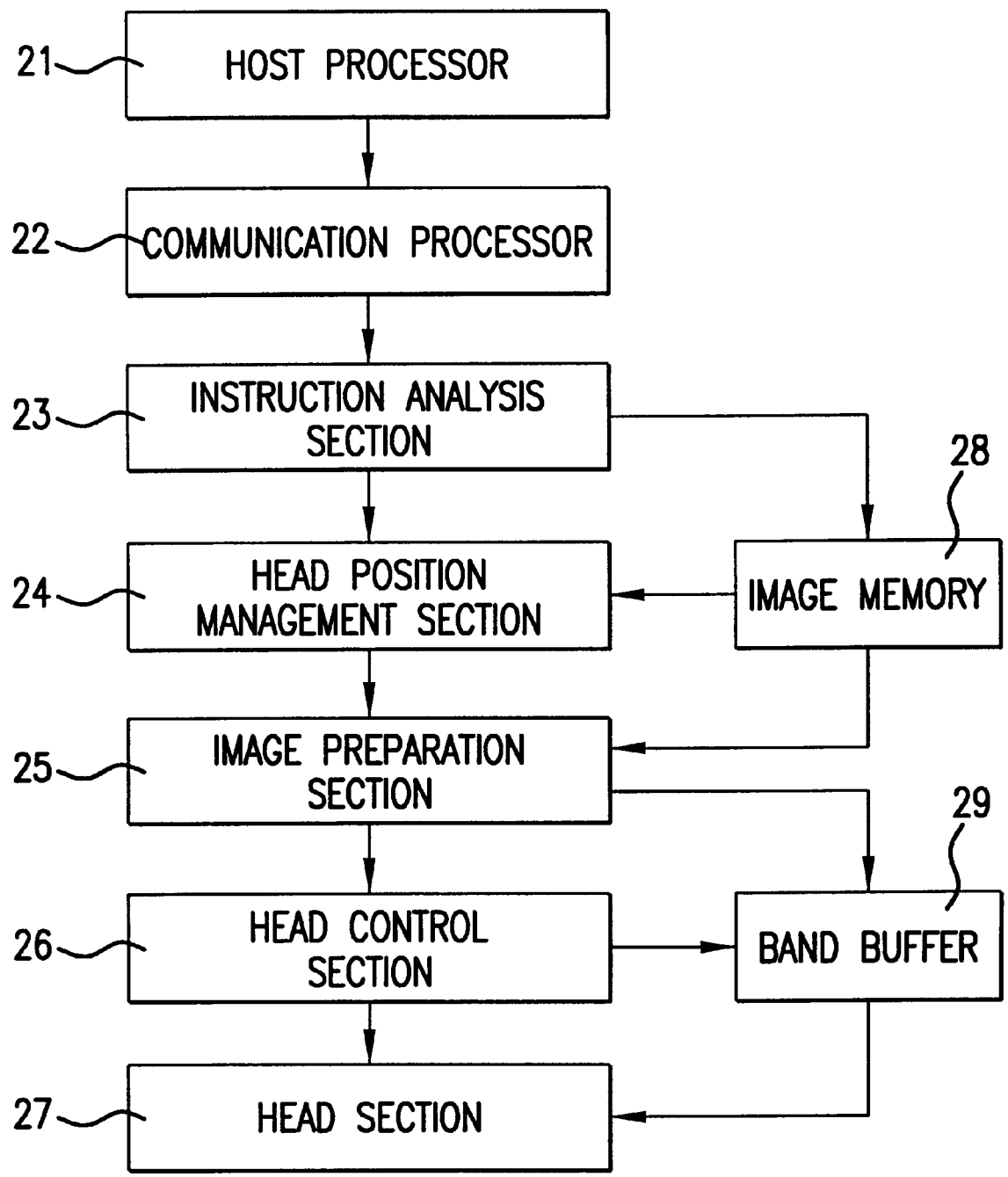
FIG. 1 is a block diagram to show one embodiment of the invention.
Figure 2:
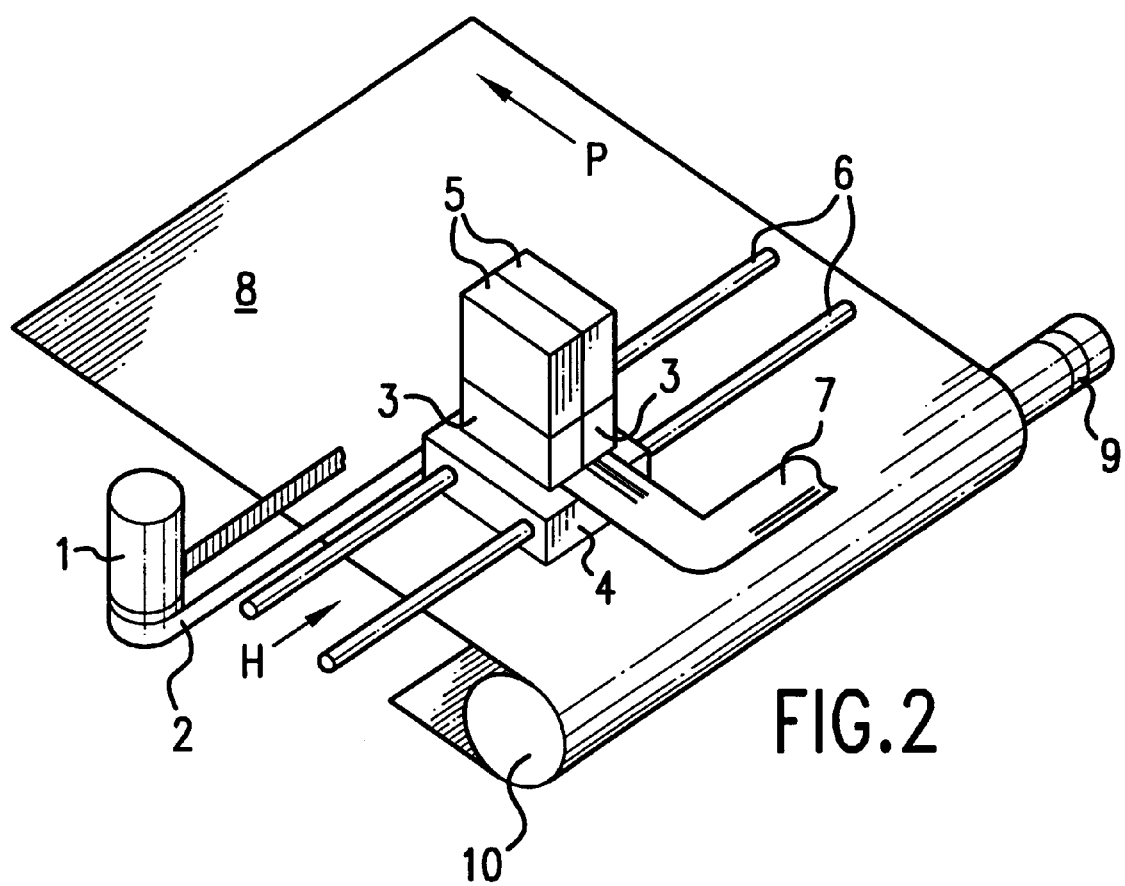
FIG. 2 is an illustration to show a schematic configuration of an example of a general serial printer.

FIG. 1 is a block diagram to show one embodiment of the invention. In the figure, numeral 21 is a host processor, numeral 22 is a communication section, numeral 23 is an instruction analysis section, numeral 24 is a head position management section, numeral 25 is an image preparation section, numeral 26 is a head control section, numeral 27 is a head section, numeral 28 is an image memory, and numeral 29 is a band buffer. The communication section 22 receives a print instruction sent from the host processor 21, etc., for example. It may be connected to the host processor 21 directly or via a network, etc., or may be connected to a storage unit such as a disk drive for fetching a print instruction from the storage unit.

The instruction analysis section 23 analyzes the print instruction received at the communication section 22 and sets or changes setup values and prepares image data in a bit map format for print in accordance with the print instruction. The image data prepared in the bit map format is stored in the image memory 28. If some processing is set for the image data prepared in the bit map format, the processing may be performed. Of course, when a bit map image is sent as the print instruction, it is stored in the image memory 28 intact or after predetermined processing is applied.

The head position management section 24 determines at least the next print position in the vertical scanning direction based on the image data stored in the image memory 28 and the print mode, etc., performs position control in the vertical scanning direction in response to the position, and instructs the image preparation section 25 to transfer image data of the area printed at the position. The description to follow assumes that the print mode provides a black mode for driving only a black head for printing and a color mode for driving both black and color heads for printing and that the two print modes are changed appropriately for printing. The head position management section 24 also controls the operation at the print mode change time.

Figure 4A:
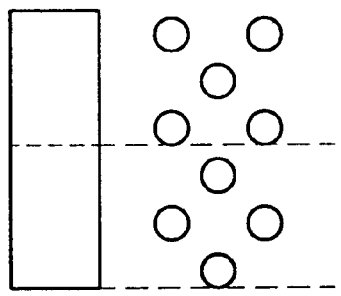
FIGS. 4A–C are illustrations of an example of a print image formed by horizontal scanning twice.
Figure 4B:
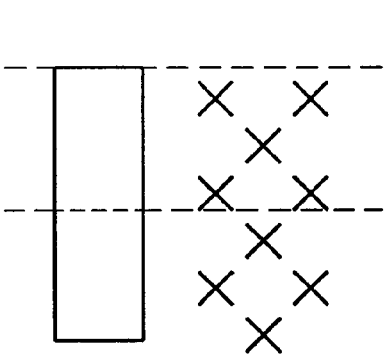
Figure 4C:
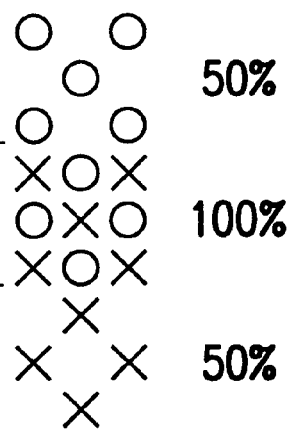
Figure 5:
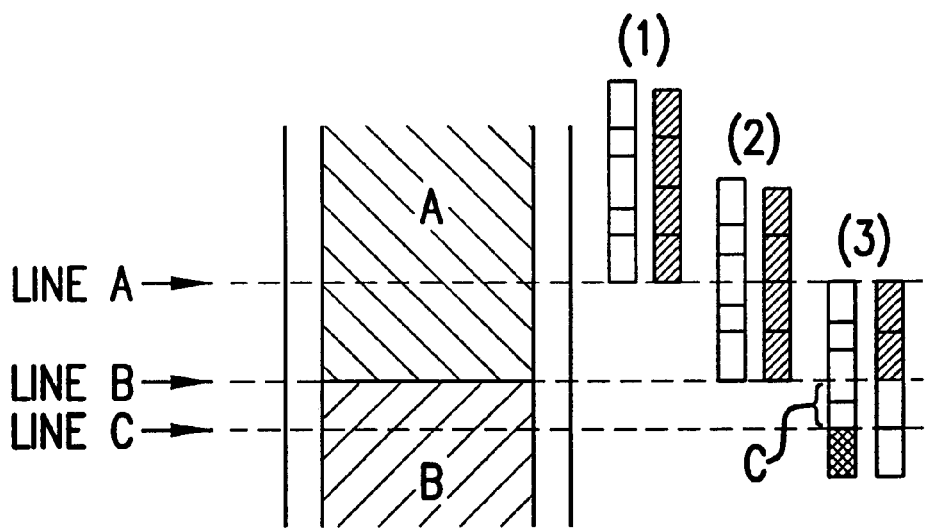
FIG. 5 is an illustration of a problem at the mode change time when split print is executed.

The image preparation section 25 reads image data corresponding to a band printed by color groups in the head section 27 from the image memory 28 in accordance with the position of the head section 27 in the vertical scanning direction determined by the head position management section 24 and stores the image data in the band buffer 29. At this time, to print the same area by performing horizontal scanning more than once, for example, as shown in FIG. 4, a filter responsive to the horizontal scanning at the time is applied to the image data before the image data is stored in the band buffer 29. FIG. 4 shows an example of completing the image by performing horizontal scanning twice; a filter for printing the dots at the ○ positions is used in FIG. 4A and a filter for printing the dots at the × positions is used in FIG. 4B. In the intermediate area in the figure, first the dots at the ○ positions are printed, then the dots at the × positions are printed. On the other hand, in the lower stage area in the figure, first the dots at the × positions are printed, then the dots at the ○ positions are printed. The filter is thus changed in response to each horizontal scanning and the same filter is used in one horizontal scanning. It is also possible that the filter is changed in response to the number of print times of each area. However, for example, filtering must be performed so as to print × dots in the upper half and ○ dots in the lower half in FIG. 4B; processing becomes intricate and at the joints, the × and ○ dots adjoin each other and may be concatenated, changing the density. By adopting the method shown in FIG. 4, only one filter may be used in one horizontal scanning, processing can be made efficient, and the adverse effect of concatenating dots at the joints can be prevented although the dot formation order varies from one area to another.

When the image preparation section 25 has transferred the image data to the band buffer 29, the head control section 26 reads the image data in the band buffer 29 in sequence and gives a drive pulse to the head section 27 in response to a move of the head section 27 in the horizontal scanning direction.

Figure 3:
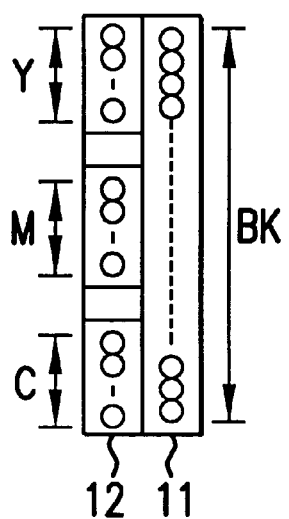
FIG. 3 is a schematic drawing to show an example of recording heads used with a 2-head printer.

The head section 27 consists of a color head 12 and a black head 11, for example, as shown in FIG. 3, and records dots on a recording medium in response to the drive pulse given by the head control section 26 and the image data read from the band buffer 29.

Although the print instruction is sent from the host processor 21 in the example shown in FIG. 1, the instruction analysis section 23 is not required in a printer accepting image data only in the bit map format. The host may realize the function to the image preparation section 25 and image data for printing with the position managed by the head position management section 24 may be transferred to the band buffer 29 of the printer for printing the image data. Further, the image memory 28 and the band buffer 29 are separate components in FIG. 1, but may be provided as separate areas in the same storage unit.

Next, an example of the operation in the embodiment of the invention will be discussed. When a print instruction is sent from the host processor 21, the communication section 22 receives the print instruction and passes it to the instruction analysis section 23, which then analyzes the passed print instruction and sets or changes setup values and prepares image data in the bit map format for print in accordance with the print instruction. The prepared image data and the image data sent in the bit map format are written into the image memory 28.

The head position management section 24 prereads image data in the image memory 28 and determines at least the position of the head section 27 in the vertical scanning direction in response to the image to be printed. For example, if a reasonable blank area exists from the current tip position of the head section 27, the blank area need not be printed, thus the head position management section 24 performs the white skip operation for moving the head section 27. Of course, it may also determine the position of the head section 27 in the horizontal scanning direction and if a blank area exists in the horizontal scanning direction, it may be skipped under the control of the head position management section 24.

The head position management section 24 performs control responsive to the print mode. That is, it performs print control in the black mode in an area where a black image continues; it performs print control in the color mode in an area where an image containing any color other than black continues. At this time, the head position management section 24 determines at least the position of the head section 27 in the vertical scanning direction in response to the print mode and its state and gives an instruction of the area of the image data transferred to the band buffer 29 to the image preparation section 25. The processing in each mode will be discussed later.

When the head position management section 24 determines at least the position of the head section 27 in the vertical scanning direction, the image preparation section 25 reads the image data of the band printed if horizontal scanning is executed at the determined position of the head section 27 from the image memory 28, uses the filter corresponding to the next horizontal scanning to filter the image data, and stores the resultant image data in the band buffer 29. For example, in the head configuration shown in FIG. 3, if the head section 27 is at the same position, cyan (C), magenta (M), and yellow (Y) print areas differ. Thus, the image data responsive to each color print area is read from the image memory 28. Since the black mode and the color mode differ in print area with the black head 11, the image data of the print area responsive to the mode is read from the image memory 28. The image data is filtered, then stored in the band buffer 29.

Upon completion of transferring the image data to the band buffer 29, the image preparation section 25 gives a print execution instruction to the head control section 26, which then reads the image data from the band buffer 29 in synchronization with the move timing of the head section 27 in the horizontal scanning direction and sends a drive pulse to the head section 27. The head section 27 records a dot in response to the image data and the drive pulse. For example, when the image data of one dot is "1," the head section 27 records the dot at the timing at which the drive pulse is given.

Figure 6:
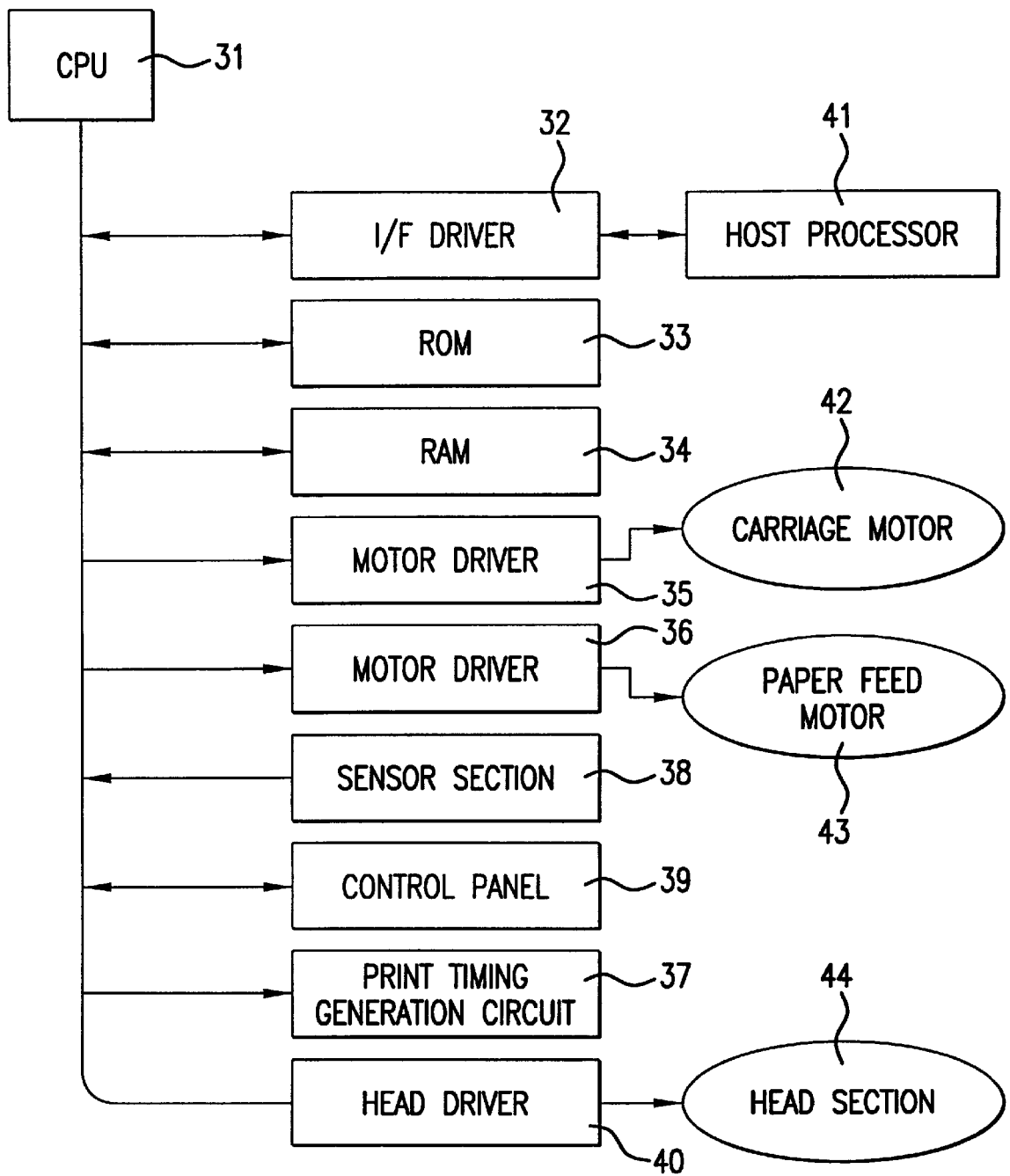
FIG. 6 is a block diagram to show a configuration example for realizing the embodiment of the invention.

FIG. 6 is a block diagram to show a configuration example for realizing the embodiment of the invention. In the figure, numeral 31 is a CPU (central processing unit), numeral 32 is an I/F (interface) driver, numeral 33 is a ROM (read-only memory), numeral 34 is a RAM (random access memory), numerals 35 and 36 are motor drivers, numeral 37 is a print timing generation circuit, numeral 38 is a sensor section, numeral 39 is a control panel, numeral 40 is a head driver, numeral 41 is a host processor, numeral 42 is a carriage motor, numeral 43 is a paper feed motor, and numeral 44 is a head section. Using the RAM 34, the CPU 31 controls the recorder components according to control procedures and data stored in the ROM 33 or detection data of the sensor section 38 containing a paper detection sensor. The CPU 31, which is connected to the host processor such as a computer via the interface driver 32, stores record data such as image data sent from the host processor 41 in the RAM 34, interprets a command signal of a command, etc., and a record information signal from the host processor 41, and controls the record operation. The RAM 34 has a work area of the CPU 31 and also functions as an image memory in which the image data to be recorded for each color is expanded into dots and stored. The motor drivers 35 and 36 and the head driver 40 control the carriage motor 42, the paper feed motor 43, and the head section 44 respectively in accordance with instructions of the CPU 31. The print timing generation circuit 37 generates a timing signal for jetting ink from the head section 44 based on an instruction of the CPU 31 and supplies the timing signal to the head driver 40. The sensor section 38 senses the sections of the recorder with respect to a temperature, the ink amount, the presence or absence of paper, and the like, and transmits the sense result to the CPU 31. The recorder state is displayed on the control panel 39 and the user enters a command through the control panel 39.

Figure 7:
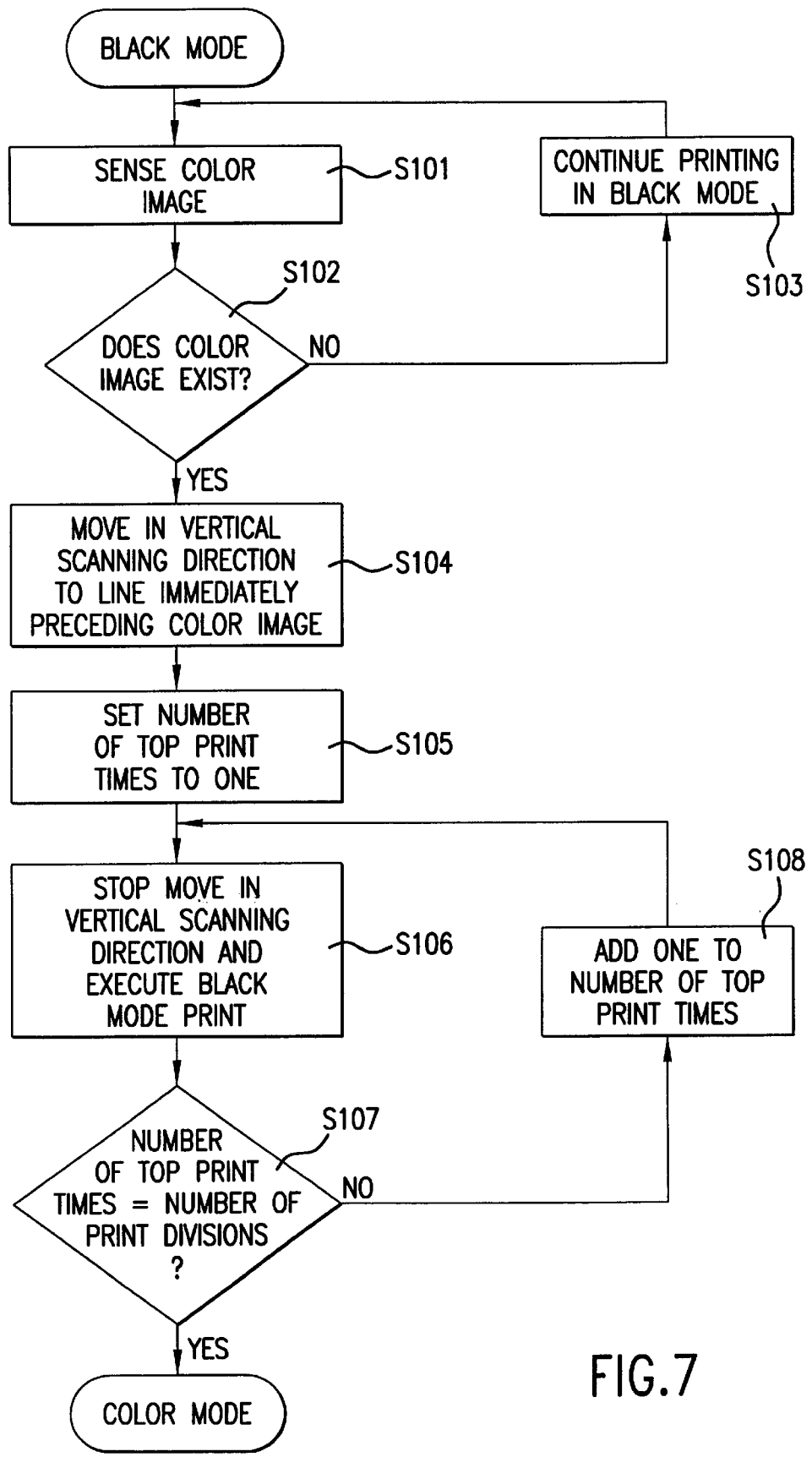
FIG. 7 is a flowchart to show a first example of the operation at the change time from a black mode to a color mode in the embodiment of the invention.

Next, the operation of the head position management section 24 in each print mode will be discussed. FIG. 7 is a flowchart to show a first example of the operation at the change time from the black mode to the color mode in the embodiment of the invention. In the embodiment, the two print modes of the black mode and the color mode are provided and print is executed while the two print modes are changed. Here, first assume that the black mode operation is performed. In the black mode, only the black head is used and, for example, if the number of print divisions is two, 50% print is executed with the lower half of the black head and the remaining 50% print is executed with the upper half, thereby accomplishing 100% print.

In the black mode, at step S101, image data of colors is preread for as many lines as the number of print dots of the black head divided by the number of print divisions. At step S102, whether the data to be printed is color data or black data is determined from the preread image data of colors and whether or not color data exists within the preread range is determined. If color data does not exist, control goes to step S103 at which the preread black data is used to continue printing in the black mode. That is, the black head is driven for executing horizontal scanning, then a relative move in the vertical scanning direction is made as wide as the width of as many lines as the number of print dots of the black head divided by the number of print divisions.

If color data exists within the preread range, control goes to step S104 at which a relative move in the vertical scanning direction is made to the line immediately preceding where the color data exists. Then, at step S105, the number of top print times is set to 1 and at step S106, the relative move in the vertical scanning direction is stopped and black mode print is executed. At step S107, whether or not the number of top print times reaches the number of print divisions is determined. If horizontal scanning is not executed as many times as the number of print divisions, control goes to step S108 at which the number of top print times is incremented by one. Then, control returns to step S106 and the black mode print with the relative move in the vertical scanning direction stopped is repeated. The horizontal scanning is thus executed as many times as the number of print divisions over the lines where the relative move in the vertical scanning direction was made at step S104, completing 100% print. At this time, the number of top print times becomes the number of print divisions, satisfying the condition at step S107, thus a transition is made to the color mode.

Here, the line on which a move in the vertical scanning direction is to be made at step S104, which will be hereinafter called mode change point, is the line immediately preceding where color pixels exist, but need not necessarily be the immediately preceding line and may precede the line where color pixels exist. If an area where only black pixels exist is printed in the color mode, the print speed is only slowed down and the print result does not involve a problem. However, if an area where color pixels exist is printed in the black mode, of course, missing color is caused and a desired print result is not produced. Therefore, there is no problem if the mode change point is set in a direction widening the area printed in the color mode if it is within the range in which slowing down of the print speed is allowed.

For example, to use a filter when split print is executed as described above, it is. convenient to set the print position feed width in n-line units matching the size of the filter. To perform image processing in block units, the feed width may be limited matching the image processing blocks. Further, feed control may be able to be performed only in n-line units because of limitations in the feed mechanism in the vertical scanning direction. To control the print position feed width (number of lines) every n lines (n is an integer of two or more) rather than every line, it may be impossible to move to the immediately preceding line. Assuming that the feed width is controlled in 5-line units, if color pixels exist on the 103rd line, a move cannot be made to the 102nd line, thus a relative move may be made to, for example, the 100th line among the lines preceding the 103rd line to which a move can be made.

If color pixels exist on a leading line of the preread data, the mode can also be changed on the line immediately preceding the preread image data rather than the line immediately preceding where the color pixels exist for starting to print the first line of the preread line in the color mode. If the mode is thus changed, slowing down the speed caused by frequent occurrence of mode change is not incurred; resultantly, the print speed can be enhanced. A threshold value can also be set to control the mode change frequency in such a manner that, for example, if color pixels exist within 10 lines from the top of the preread data, color mode print is executed starting at the top of the preread data.

Thus, the line where a move in the vertical scanning direction is to be made at step S104 (mode change point) may be set several lines before the line where color pixels exist. However, for convenience, in the description that follows, the mode change point is set to the immediately preceding line.

In the color mode, the color head and the black head are driven for printing. For example, if the number of print divisions is two, 50% print is executed in the lower half and the remaining 50% print is executed in the upper half for each color of the color head. The black head prints with the same number of dots as those of each color of the color head; 50% print is executed in the lower half of the dot string printed at the time and the remaining 50% print is executed in the upper half.

In the normal operation of the color mode, first the image data as wide as the print width of a single color in the color head divided by the number of print divisions is preread. At this time, if color data exists, the color mode print is continued. If there are lines with no print data from the top of the print area for each color, the lines can also be skipped.

If color data does not exist as a result of the prereading, further the image data as wide as the print width of the black head is preread. At this time, if color data exists, the color mode print is continued. If color data does not exist as a result of the prereading of the image data as wide as the print width of the black head, all data to the current position of the head is printed in the color mode, then the color mode is changed to the black mode for printing. The processing at this mode change time will be discussed later.

Figure 8:
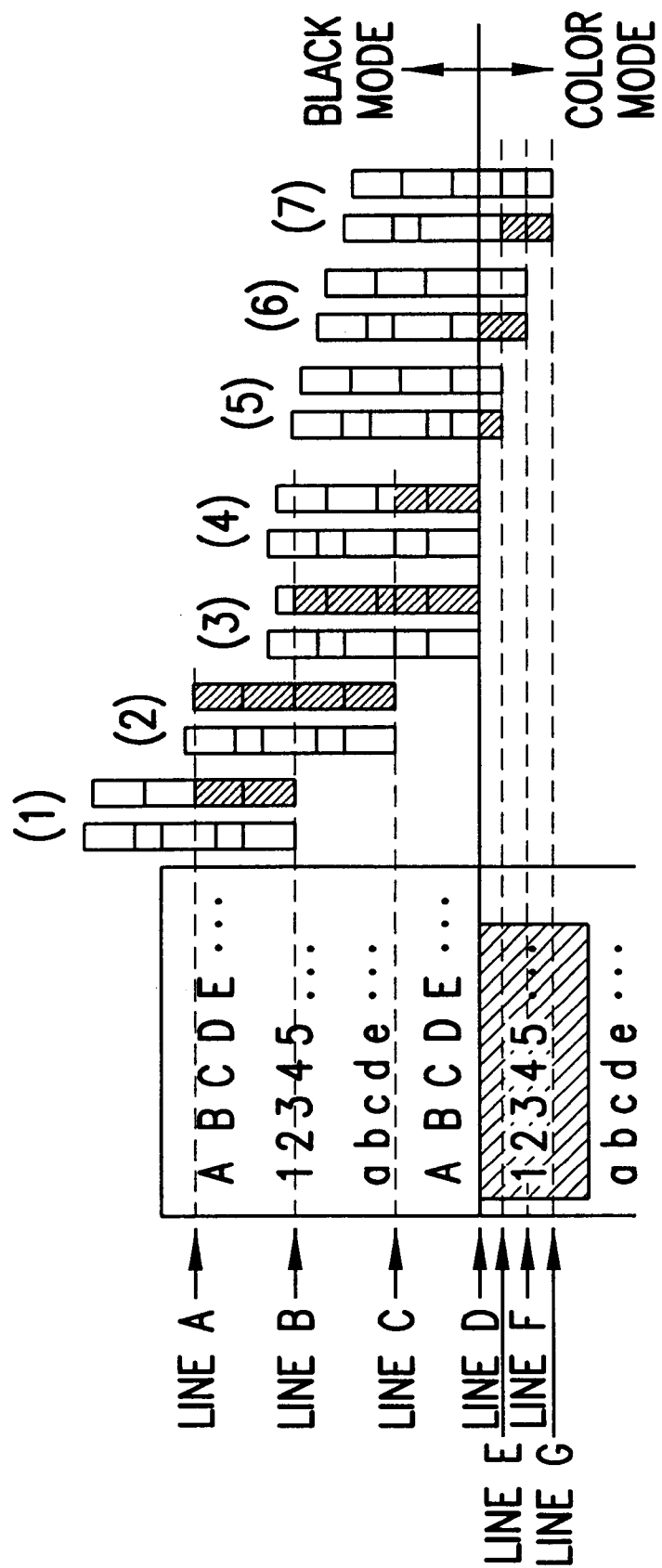
FIG. 8 is an illustration of a specific example of the first example of the operation at the change time from the black mode to the color mode in the embodiment of the invention.

FIG. 8 is an illustration of a specific example of the first example of the operation at the change time from the black mode to the color mode in the embodiment of the invention. In the description to follow, the color head prints three colors of cyan, magenta, and yellow each with an equal number of dots. In the figure, the colors are cyan, magenta, and yellow in order from the bottom to the top. The black head has as many dots as the number four times the number of dots of a single color. The current position of the head indicates the lower end of the print area of the head; in the initial state, the upper end of recording paper is the current position. Further, the number of print divisions is two and the same area is printed by executing horizontal scanning twice, forming a 100% image. To make a relative move in the vertical scanning direction, recording paper is moved. The portions of each head used for print are hatched.

In the example shown in FIG. 8, a line of "ABCDE . . . ," a line of "12345 . . . ," and a line of "abcde . . ." are printed repeatedly in black. The hatched portion of the fifth line is printed in green by superimposing cyan and yellow.

In the initial state, the lower end of the head is aligned with the upper end of recording paper. Since blank exists in the upper end part of image data, the recording paper is fed over the portion and the current position of the recording head is set to the upper end of the first line "ABCDE . . . ," namely, line a. In this state, the image data of each color as wide as a half of the print width of the black head is preread. Since the number of print divisions is two, a half of the print width is applied. In the example in FIG. 8, the image data between line a and the position immediately preceding line b is preread, wherein a black image exists, but color data other than black does not exist. Thus, black mode print is executed. The recording paper is fed to the position immediately preceding line b and horizontal scanning is executed at the position in (1) in FIG. 8 for performing the first print of the area between line a and the position immediately preceding line b with the lower half of the black head.

After the printing in (1) in the figure, the black mode still remains. Thus, further the image data of each color as wide as a half of the print width of the black head is preread. Also in this case, color data does not exist in the preread range, thus black mode print is executed. That is, the recording paper is fed to the position immediately preceding line c and at the position in (2) in the figure, the whole black head is used to execute horizontal scanning, whereby the second print of the area between line a and the position immediately preceding line b and the first print of the area between line b and the position immediately preceding line c are executed.

Further, the image data of each color as wide as a half of the print width of the black head is preread. In this case, color data exists on line d. Thus, in the subsequent print processing, change is made to the color mode. First, the area between line c and the position immediately preceding line d containing only black data is printed in the black mode. Also, the second print of the area between line b and the position immediately preceding line c needs to be executed. First, the recording paper is fed to the position immediately preceding line d and at the position in (3) in the figure, the black head is used to execute horizontal scanning (the black head portion used for the printing is the portion corresponding to the width of line b to the position immediately preceding line d), whereby the second print of the area between line b and the position immediately preceding line c and the first print of the area between line c and the position immediately preceding line d are executed.

In this state, the second print of the area between line c and the position immediately preceding line d is not yet executed. Thus, the recording paper is not fed and horizontal scanning is again executed at the same position, as shown in (4) in the figure. At this time, the black head portion used for the printing is the portion corresponding to the width of line c to the position immediately preceding line d and is reduced as compared with the head portion used in (3) in the figure. Such horizontal scanning at the same position is executed as many times as the number of print divisions; since the number of print divisions is two, the horizontal scanning is executed twice in (3) and (4) in the figure. After the horizontal scanning at the same position is executed as many times as the number of print divisions, change is made to the color mode.

In the color mode, first the image data as wide as a half of the print width of a single color in the color head is preread. Here, the image data between line d and the position immediately preceding line e is preread. Since this area contains green, namely, cyan and yellow color data, color mode print is executed as in the state. First, the recording paper is fed a half of the print width of a single color and horizontal scanning is executed at the position in (5) in the figure for performing the first print of the area between line d and the line immediately preceding line e with the cyan part of the color head.

Next, the image data as wide as a half of the print width of a single color in the color head from line e to the line immediately preceding line f is preread. Since this area also contains color data, the recording paper is fed a half of the print width of a single color and horizontal scanning is executed at the position in (6) in the figure, thereby performing the second cyan print of the area between line d and the line immediately preceding line e and the first cyan print of the area between line e and the line immediately preceding line f.

Likewise, the sequence of prereading the image data as wide as a half of the print width of a single color in the color head, feeding the recording paper a half of the print width of a single color, and executing the horizontal scanning is repeated. When the area following line d is contained in the yellow print area of the color head, yellow is recorded on previously printed cyan to produce green. At this time, a black character portion is also recorded by the black head.

Figure 9:
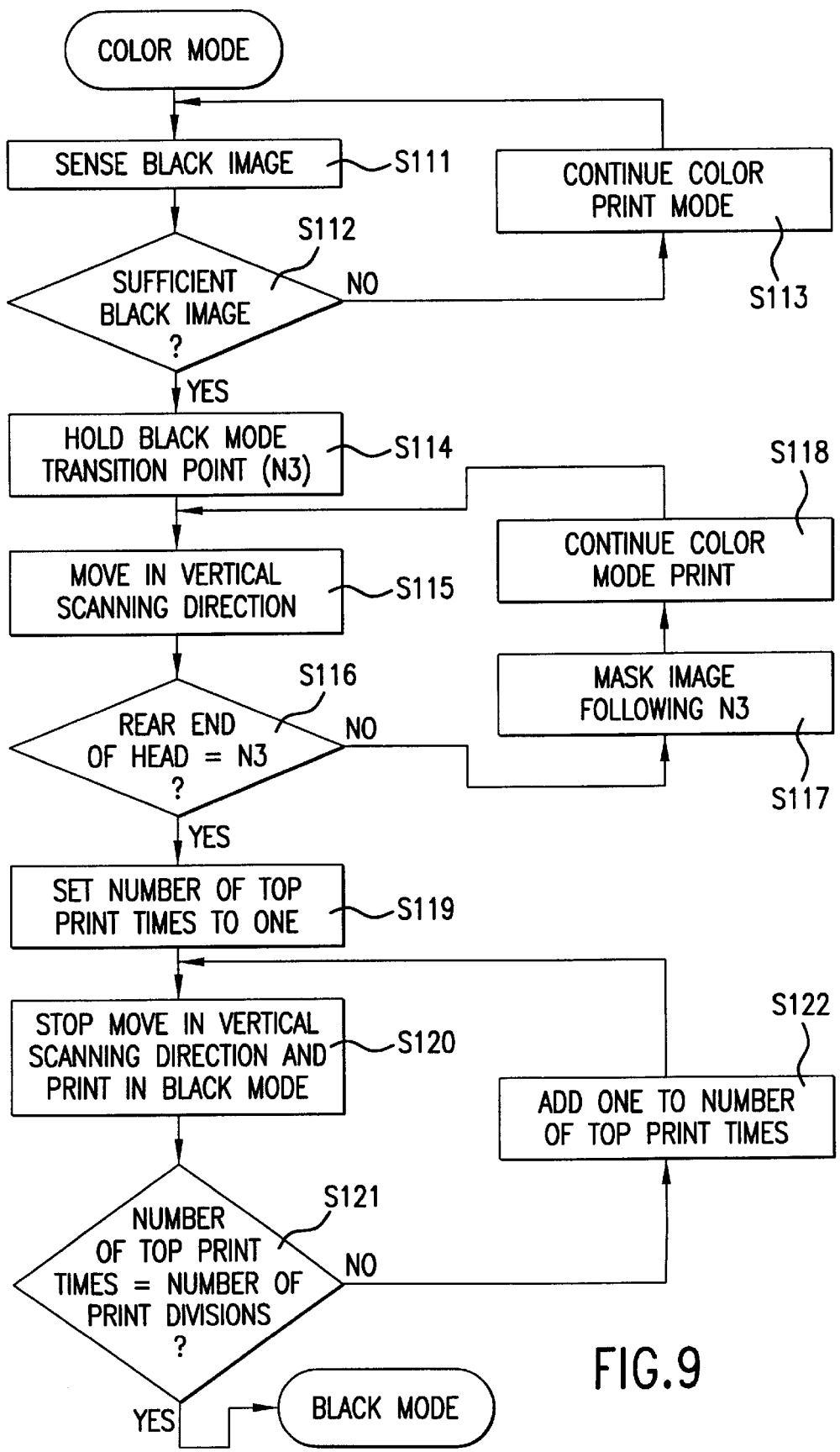
FIG. 9 is a flowchart to show a first example of the operation at the change time from the color mode to the black mode in the embodiment of the invention.

FIG. 9 is a flowchart to show a first example of the operation at the change time from the color mode to the black mode in the embodiment of the invention. Here, in contrast to the above-described operation, assume that the color mode operation is performed. The operation when change is made to the black mode will be discussed. In the color mode, both the black and color heads are used for printing. At this time, the black head uses only as many dots as the number of dots of a single color of the color head. For each color containing black, for example, if the number of print divisions is two, 50% print is executed with the lower half of each color and the remaining 50% print is executed with the upper half, thereby accomplishing 100% print.

In the color mode, at step S111, a black image is sensed. First, the image data of each color is preread for as many lines as the number of dots of a single color divided by the number of print divisions. Whether or not it contains color data is determined. If color data is contained, control goes to step S113 from step S112. If color data is not contained, further the image data of each color as wide as the print width of the black head is preread. Whether or not it contains color data is determined. If color data is contained, it is assumed at step S112 that a sufficient black image is not applied, and control goes to step S113 at which color mode print is executed. In the normal operation of the color mode, a relative move in the vertical scanning direction is made as wide as the print width of a single color of the color head divided by the number of print divisions and the color and black heads are driven for executing horizontal scanning for printing.

If color data does not exist in the image data preread as wide as the print width of the black head, control goes to change processing to the black mode. First, at step S114, the line immediately preceding the preread image data is held as the black mode transition point N3. It need not be immediately preceding line as at the change time from the black mode to the color mode. To change from the color mode to the black mode, any line can be set as the black mode transition point N3 if it is the line immediately preceding the preread image data or a line after the first line of the preread data. If the area to be printed in the color mode is printed in the black mode, missing color occurs, caused a problem. In contrast, if the area to be printed in the black mode is printed in the color mode, the print speed is only slowed down and the print result does not change. Thus, the black mode transition point N3 may be shifted if it is set in a direction widening the range to be printed in the color mode. For convenience, in the description that follows, the black mode transition point N3 is set immediately preceding the preread data.

At step S115, a move in the vertical scanning direction is made by a half of the print width of a single color of the color head. At this time, when a move in the vertical scanning direction is made by a half of the print width of a single color of the color head, if the rear end of the black head exceeds the black mode transition point N3, the move in the vertical scanning direction is made until the rear end of the black head becomes the black mode transition point N3. At step S116, whether or not the rear end of the black head is the black mode transition point N3 is determined. If the rear end of the black head is not the black mode transition point N3, control goes to step S117 at which the image following the black mode transition point N3 is masked to skip printing. Then, at step S118, normal color mode print is executed and control returns to step S115s. At steps S115–S118, horizontal scanning is executed over the color area as many times as the number of print divisions, completing an image.

If it is determined at step S116 that the rear end of the black head has become the black mode transition point N3, color area print is complete. Then, black mode print is executed. However, if horizontal scanning is executed and a move in the vertical scanning direction is made, horizontal scanning is not executed in the portion just below the color area, for example, as many times as the number of print divisions, resulting in a state in which one horizontal scanning has been executed, degrading the print density. Thus, horizontal scanning is executed as many times as the number of print divisions while the black head print width is increased gradually at the same position without moving in the vertical scanning direction. Then, a transition is made to the normal black mode operation.

First, at step S119, the number of top print times is set to one. At step S120, print is executed with the black head at the same position without moving in the vertical scanning direction. The printed area at this time is changed in response to the number of top print times. At step S121, whether or not the number of top print times reaches the number of print divisions is determined. If horizontal scanning is not yet executed as many times as the number of print divisions, control goes to step S122 at which the number of top print times is incremented by one. Then, at step S120, horizontal scanning is executed. After print with the black head at the same position is thus executed as many times as the number of print divisions, normal black mode print is executed. The normal black mode print operation has already been described and therefore will not be discussed again.

Figure 10:
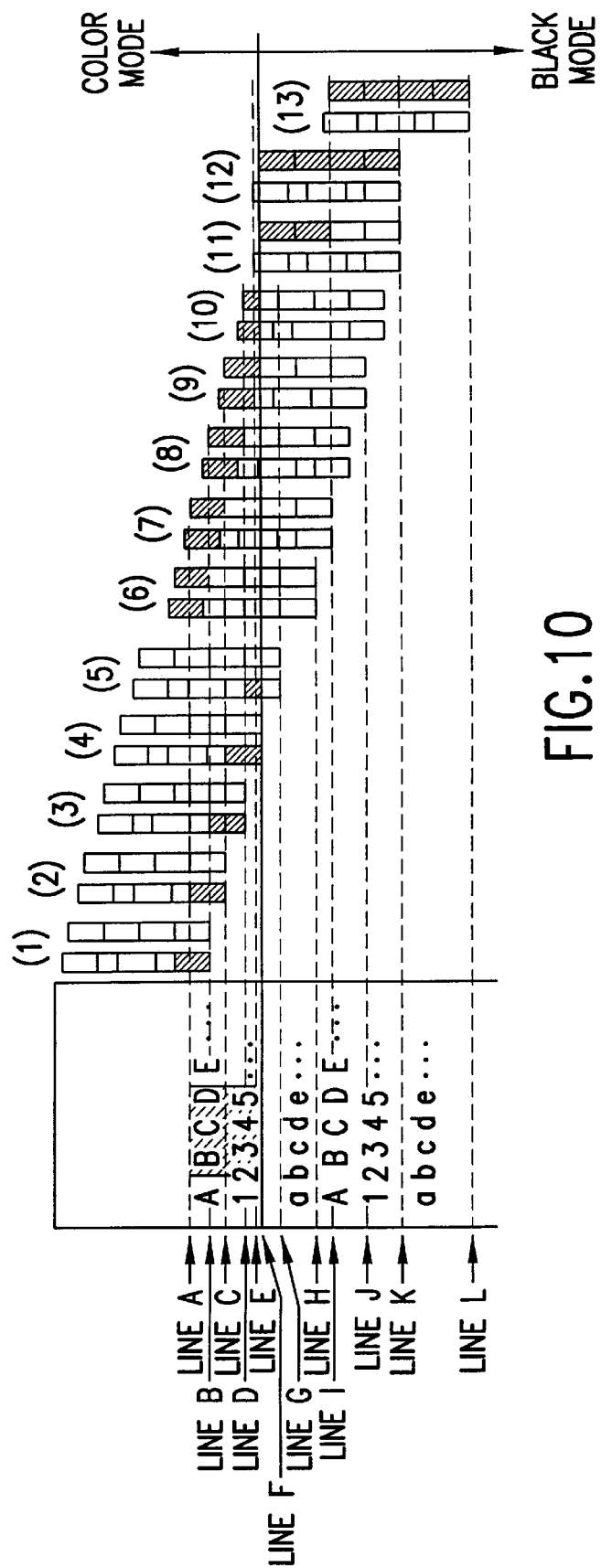
FIG. 10 is an illustration of a specific example of the first example of the operation at the change time from the color mode to the black mode in the embodiment of the invention.

FIG. 10 is an illustration of a specific example of the first example of the operation at the change time from the color mode to the black mode in the embodiment of the invention. The prerequisites in the description to follow are similar to those previously described with reference to FIG. 8. In the color mode, the top quarter of the black head in FIG. 10 is used for printing. In the example shown in FIG. 10, a line of "ABCDE . . . ," a line of "12345 . . . ," and a line of "abcde . . ." are printed repeatedly in black. The hatched portion of the first and second lines is printed in green by superimposing cyan and yellow.

In the example shown in FIG. 10, line a is the top of an image and recording paper is fed to this position at the beginning. The image data of each color of the area as wide as a half of the print width of a single color is preread. That is, the image data of the area between line a and the position immediately preceding line b is preread. It contains color data. Thus, color mode print is executed. The recording paper is fed to the position immediately preceding line b and horizontal scanning is executed at the position in (1) in the figure for executing the first print of the area between line a and the position immediately preceding line b with the lower half of the cyan print width of the color head.

Further, the image data of each color as wide as a half of the print width of a single color of the color head is preread. Also in this case, color data exists in the preread range, thus color mode print is executed. That is, the recording paper is fed to the position immediately preceding line c and horizontal scanning is executed at the position in (2) in the figure with the cyan print width of the color head, whereby the second cyan print of the area between line a and the position immediately preceding line b and the first cyan print of the area between line b and the position immediately preceding line c are executed. Likewise, at the position in (3) in the figure, the second cyan print of the area between line b and the position immediately preceding line c and the first cyan print of the area between line c and the position immediately preceding line d are executed.

Further, the image data of each color as wide as a half of the print width of a single color is preread. In this case, color data is out on line e. However, the preread image data contains color data, thus the color mode print is continued. The recording paper is fed to the position immediately preceding line f and at the position in (4) in the figure, the second cyan print of the area between line c and the position immediately preceding line d and the first cyan print of the area between line d and the position immediately preceding line e are executed.

Further, the image data of each color as wide as a half of the print width of a single color is preread. At this time, color data does not exist in the preread range. Thus, the image data of each color as wide as the print width of the black head is preread, but does not contain color data either. In such a case, change is made from the color mode to the black mode. To change from the color mode to the black mode, first the current position, namely, line f is held as the black mode transition point and color mode area print before line f is terminated. Then, initial print in the black mode is executed and a transition is made to the normal black mode operation.

The color mode area print before line f is terminated. In this processing, the image data following line f is masked to skip printing and the preceding image data is printed as in the normal color mode. That is, from the position in (4) in the figure, the recording paper is fed by a half of the record width of a single color and at the position in (5) in the figure, the second cyan print of the area between line d and the position immediately preceding line f is executed.

Color image data to be printed does not exist ahead of a half of the record width of a single color from the position in (5) in the figure. Thus, the recording paper is fed at a time by the record width of a single color and a move is made to the position in (6) in the figure at which the yellow portion of the color head and the color mode print portion of the black head extend across the area between lines a and b. The first yellow and black print of the portions is executed. In the printing, yellow is superimposed on previously printed cyan to produce green in the hatched region.

Likewise, at positions (7)–(10) in the figure, print is executed in yellow and black and horizontal scanning is executed twice for each color over the area to the position immediately preceding line f, forming an image.

After the horizontal scanning at the position in (10) in the figure, the recording paper is fed so that the rear end of the black head becomes line f, resulting in the position in (11) in the figure. This position is the black mode transition point. By the operation performed so far, the color mode area print is complete. Then, the color mode is changed to the black mode. However, if horizontal scanning and the recording paper feed operation are performed as in the state, the area between line f and the position immediately preceding line i is printed only once. Thus, the first print of the area between line f and the position immediately preceding line i is executed at the position in (11) in the figure and at the position in (12) in the figure which is the same as the position in (11), the second print of the area between line f and the position immediately preceding line i and the first print of the area between line i and the position immediately preceding line k are executed. After this, normal black mode print, namely, a sequence of prereading the area as wide as a half of the print width of the black head, feeding the recording paper, and executing the horizontal scanning for printing will be executed.

The horizontal scanning is thus executed more than once over the black area as well as the color area for performing 100% printing, whereby misalignment of joints of areas formed in each scanning caused by a recording paper feed error and dot position misalignment caused by directivity variations in nozzles can be made inconspicuous and adjacent dots printed at the same time can be decreased for lessening bleeding for improving the image quality. The black area is printed in the black mode making full use of the wide print width of the black head, thus can be printed at high speed. For example, as shown in FIGS. 8 and 10, in the color mode, print is executed every width of dividing the print width of a single color by the number of print divisions; in the black mode, print is can be executed every width of dividing the print width of the black head wider than that of a single color by the number of print divisions.

When such split print is executed, if change is simply made from the black mode to the color mode or from the color mode to the black mode, an extra blank region becomes necessary as previously described with reference to FIG. 4. However, print control is performed as described above, whereby change can be made from the black mode to the color mode or from the color mode to the black mode without placing restrictions such as requirement of a blank region.

Further, lines with no print data are skipped as in the (5)-to-(6) transition in FIG. 10, whereby furthermore high-speed print is realized.

In the specific example, black data is printed in the color mode together with yellow, but may be printed together with cyan or magenta. Particularly, black data is printed together with cyan, whereby it can be expected that color bleeding is made inconspicuous, improving image quality.

Although the number of print divisions is two in the specific example, similar control is enabled for any number of print divisions. When the mode is changed, horizontal scanning may be repeated at the same position as many times as the number of divisions.

Figure 11:
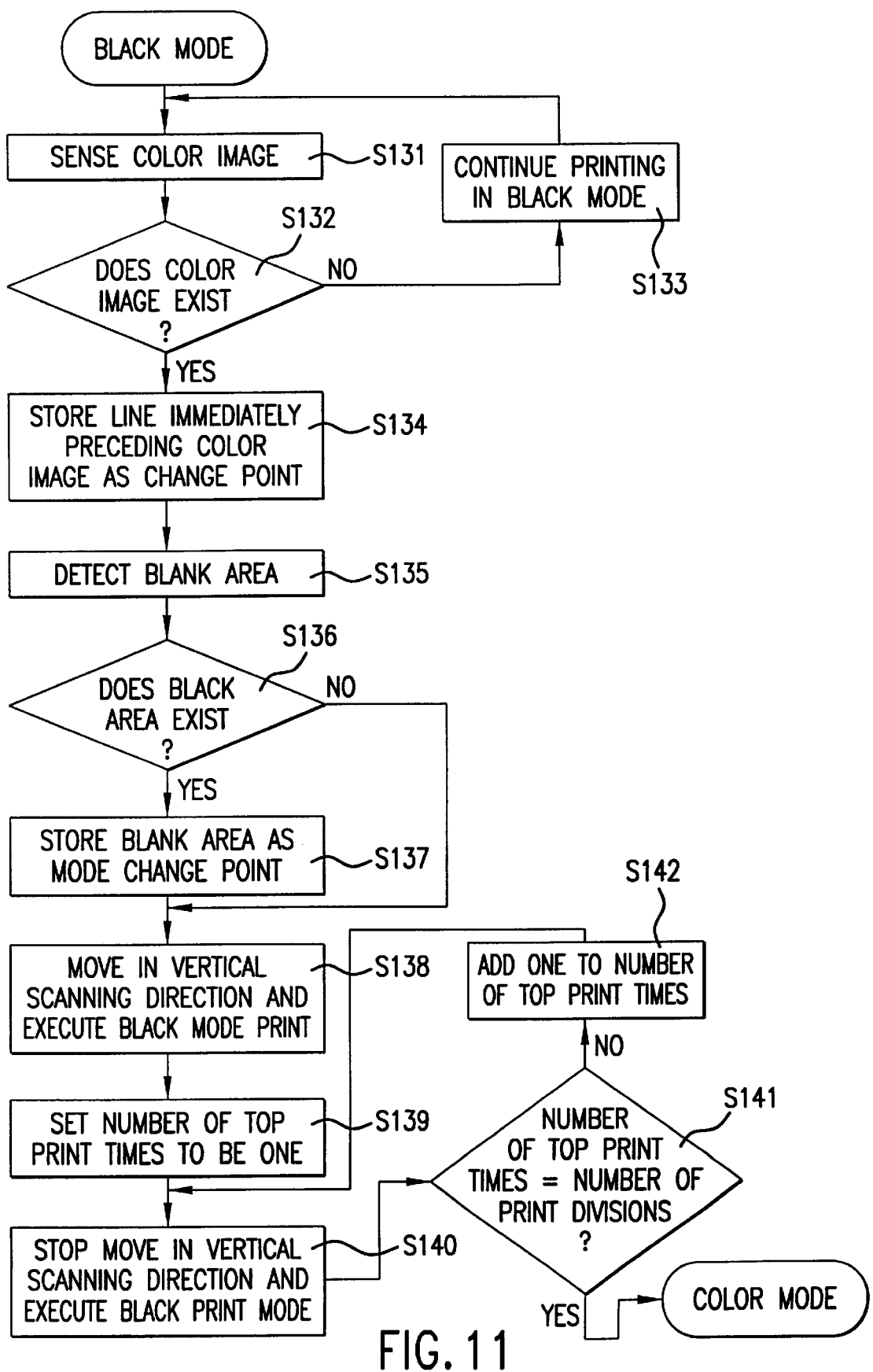
FIG. 11 is a flowchart to show a second example of the black mode operation in the embodiment of the invention.

FIG. 11 is a flowchart to show a second example of the black mode operation in the embodiment of the invention. Here, first assume that the black mode operation is performed. In the black mode, at step S131, image data of colors is preread for as many lines as the number of print dots of the black head divided by the number of print divisions. At step S132, whether the data to be printed is color data or black data is determined from the preread image data of colors and whether or not color data exists within the preread range is determined. If color data does not exist, control goes to step S133 at which the preread black data is used to continue printing in the black mode.

In the normal black mode, only the black head 11 is used and while the head section 27 is moved in the vertical scanning direction every lines as many as the number of print dots of the black head 11 divided by the number of print divisions, print is executed as many times as the number of print divisions, completing an image. For example, to complete an image by executing horizontal scanning twice, the first horizontal scanning is executed with a half of the black head 11 from the tip thereof for executing 50% print and the second horizontal scanning is executed with the remaining half of the black head 11 for accomplishing 100% print. In this case, a move in the vertical scanning direction is made a half of the print width of the black head 11 at a time.

If color data exists within the preread range, control goes to step S134 at which the line immediately preceding the color data line is stored as the mode change point. Then, at step S135, a search is made for a blank line from the color data line to the top read line. If a blank line is found, control goes to step S137 from step S136 and the blank line is stored as the mode change point.

The description to follow assumes that the first found blank line is adopted as the mode change point, but the invention is not limited to it. For example, if more than one blank line exists, the mode change point may be set in any of the blank lines. Particularly to control the print position feed width every n lines (n is an integer of two or more), it is recommendable to set the mode change point in a blank line movable in the vertical scanning direction preceding the first found blank line. When the print position feed width is thus controlled every n lines, if a blank line exists, the mode change point may be unable to be set in the blank line. In this case or if no blank line exists, the mode change point may be set in an appropriate line that can be controlled preceding the color data line, as in the first example given above.

At step S138, the mode change point is determined to be a new position of the head section 27 and the relative position of the head section 27 in the vertical scanning direction is controlled. At step S139, the number of top print times is set to 1 and at step S140, the relative move in the vertical scanning direction is stopped and black mode print is executed. At this time, the relative move in the vertical scanning direction made at step S138 is equal to or less than the number of print dots of the black head 11 divided by the number of print divisions. Thus, the full print width of the black head 11 is not necessarily used for printing. The image preparation section 25 transfers image data to the band buffer 29 so as to print only the image data as wide as the print width at the time in accordance with an instruction of the head position management section 24.

At step S141, whether or not the number of top print times reaches the number of print divisions is determined. If horizontal scanning is not executed as many times as the number of print divisions, control goes to step S142 at which the number of top print times is incremented by one. Then, control returns to step S140 and the black mode print is repeated without making the relative move in the vertical scanning direction. At this time, the image preparation section 25 is controlled so as to print as many dots as the number of dots fewer than that at the previous time by the number of print dots of the black head 11 divided by the number of print divisions. For example, when the number of print divisions is two, if two-thirds the print width of the black head are used for printing in the first processing of step S140, 100% print is complete in the half area of the print width of the rear end, of two-thirds the print width. Thus, in the second processing of step S140, only one-sixth the print width of the tip of the black head 11 is used for printing and 100% print of the area is completed. Thus, 100% print is completed in sequence and horizontal scanning is also executed as many times as the number of print divisions over the lines where the relative move in the vertical scanning direction was made at step S134, completing 100% print. At this time, the number of top print times becomes the number of print divisions, satisfying the condition at step S137, thus a transition is made to the color mode.

If a black area adjoining a color area exists, black mode print is executed to a blank area where the black area ends and following the blank area, a black area is also printed in the color mode.

Figure 12A:
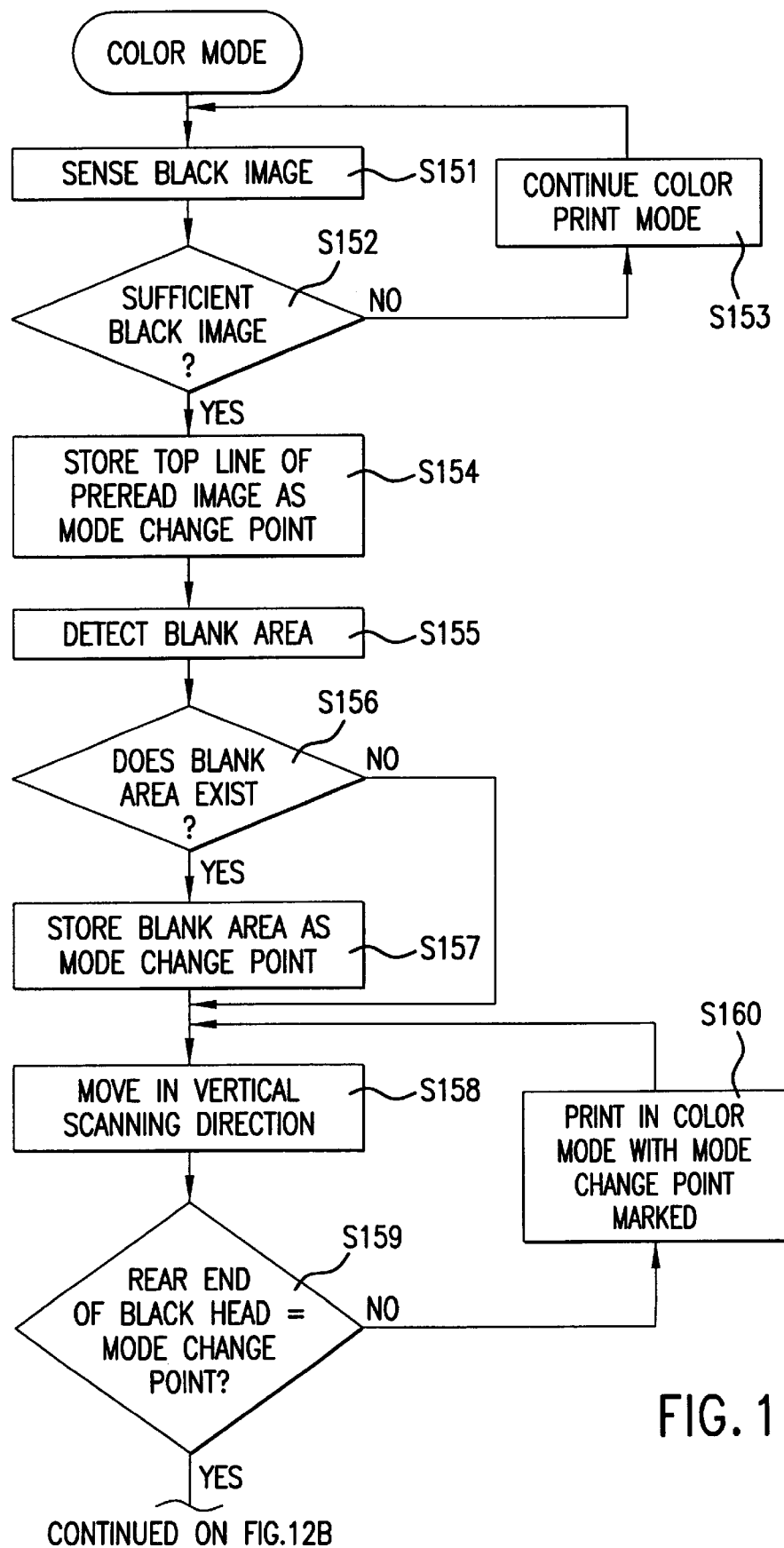
FIGS. 12A–B is a flowchart to show a second example of the color mode operation in the embodiment of the invention.
Figure 12B:
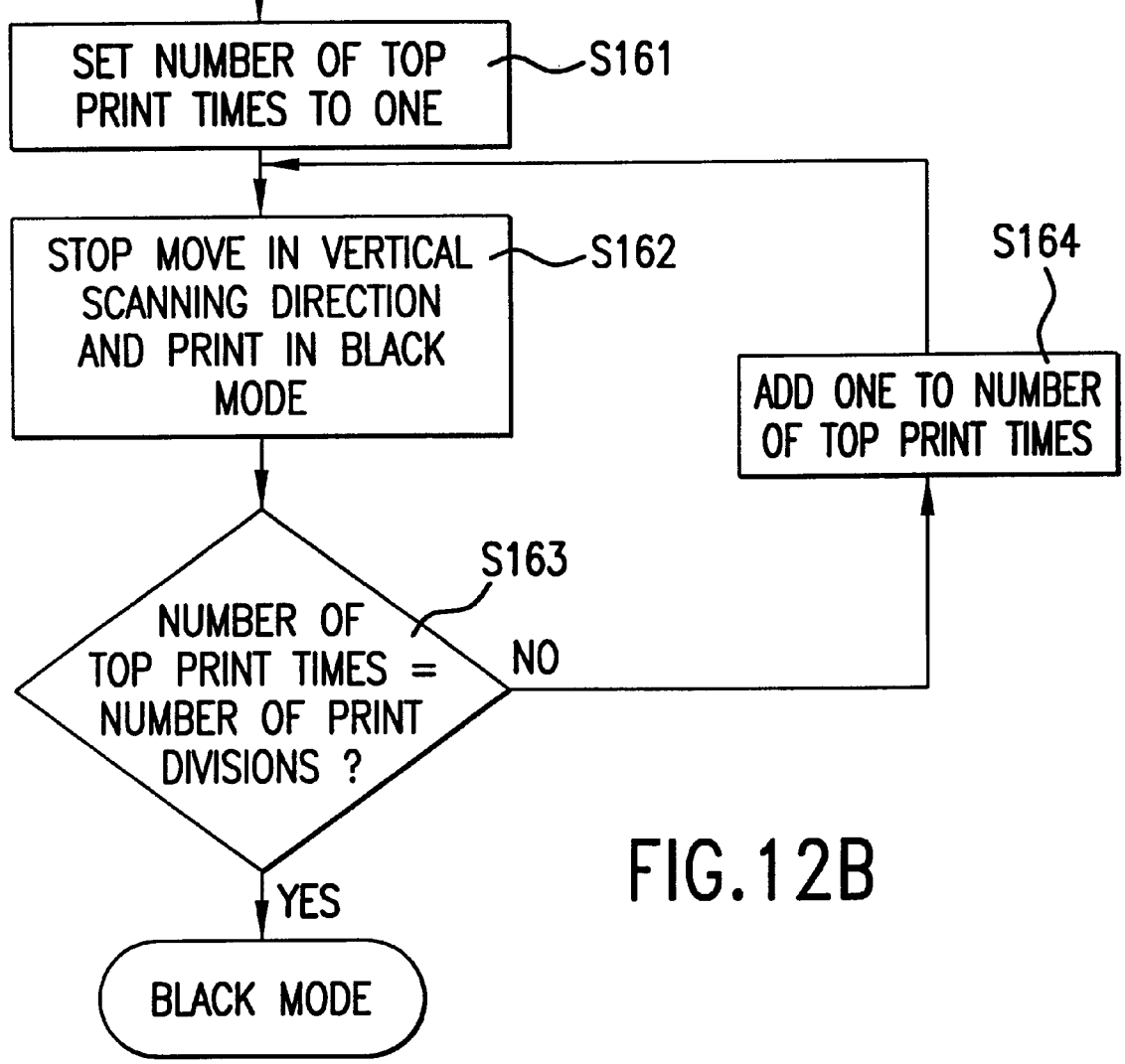

FIGS. 12A–B is a flowchart to show a second example of the color mode operation in the embodiment of the invention. Here, assume that the color mode operation is performed. In the color mode, both the black head 11 and the color head 12 are used for printing. At this time, the black head uses only as many dots as the number of dots of a single color of the color head 12. It is recommendable to control the printed dot positions so as to become the same positions as any color group of the color head 12. For each color containing black, for example, if the number of print divisions is two, 50% print is executed with the top half of each color and the remaining 50% print is executed with the rear half, thereby accomplishing 100% print.

In the color mode, at step S151, a black image is sensed. First, the image data of each color is preread for as many lines as the number of dots of a single color divided by the number of print divisions. At the preread time, the print position shift amount for each color is considered and the image data is read starting at the top print dot of each color. Whether or not it contains color data is determined. If color data is contained, control goes to step S153 from step S152. If color data is not contained, further the image data of each color as wide as the print width of the black head is preread. Whether or not it contains color data is determined. If color data is contained, it is assumed at step S152 that a sufficient black image is not applied, and control goes to step S153.

At step S153, the normal print operation in the color mode is executed. In the normal operation of the color mode, a relative move in the vertical scanning direction is made as wide as the print width of a single color of the color head divided by the number of print divisions and the color and black heads are driven for executing horizontal scanning for printing. For example, if the number of print divisions is two, for each color of the color head, 50% print is executed with the top half and the remaining 50% print is executed with the rear half. The black head prints with the same number of dots as those of each color of the color head; 50% print is executed in the top half of the dot string printed at the time and the remaining 50% print is executed in the rear half. If the color head is of three-color integral type, the relative move amount of the head section 27 in the vertical scanning direction becomes about one third or less that in the black mode. In contrast, the black mode enables print to be executed at speed three times or more that in the color mode.

If color data does not exist in the image data preread as wide as the print width of the black head, control goes to change processing to the black mode. First, at step S154, the top line of the preread image data is stored as the black mode change point. At step S155, a search is made for a blank line starting at the top line. If a blank line is found, control goes to step S157 from step S156 and the found blank line is adopted as the mode change point. After this, the image to the mode change point is printed in the color mode.

Like the mode change point from the black mode to the color mode described above, the mode change point from the color mode to the black mode is also set in the first found blank line; in addition, if more than one blank line exists, the mode change point may be set in any of the blank lines. If no blank line exists or if move control in the vertical scanning direction to the blank line is not executed, for example, as control is performed every n lines (n is an integer of two or more), it is recommendable to set the mode change point in a line following the line immediately preceding the top line of the preread image data. Here, as described above, the first found blank line or the top line of the preread image data is set as the mode change point.

At step S158, the move position in the vertical scanning direction as wide as the print width of a single color of the color head divided by the number of print divisions is determined to be a new position of the head section 27 and the relative position of the head section 27 in the vertical scanning direction is controlled. At this time, if a move in the vertical scanning direction is made to the new position of the head section 27, the rear end of the black head 11 may exceed the mode change point. In such a case, the position at which the rear end of the black head 11 becomes the mode change point is determined to be a new position of the head section 27.

At step S159, whether or not the rear end of the black head 11 is the mode change point is determined. If the rear end of the black head is not the mode change point, control goes to step S160 at which the image preparation section 25 is instructed not to transfer the image following the mode change point and print is executed in the color mode with the image following the mode change point masked to skip printing. Then, control returns to step S158. At steps S158–S160, horizontal scanning is executed over the color area and the black area adjoining the color area to the blank area each as many times as the number of print divisions, completing an image.

If it is determined at step S159 that the rear end of the black head has become the mode change point, then black mode print is executed. However, if horizontal scanning is executed and a move in the vertical scanning direction is made, horizontal scanning is not executed in the portion just below the area printed in the color mode, for example, as many times as the number of print divisions, and the head section 27 moves in a state in which one horizontal scanning has been executed, thus degrading the print density. Thus, horizontal scanning is executed as many times as the number of print divisions while the print width of the black head 11 is increased gradually at the same position without moving in the vertical scanning direction. Then, a transition is made to the normal black mode operation.

First, at step S161, the number of top print times is set to one. At step S162, print is executed with the black head 11 at the same position without moving in the vertical scanning direction. At the first time, the area of as many dots as the number of print dots of the black head 11 divided by the number of print divisions is printed.

At step S163, whether or not the number of top print times reaches the number of print divisions is determined. If horizontal scanning is not yet executed as many times as the number of print divisions, control goes to step S164 at which the number of top print times is incremented by one. Then, control returns to step S120 and horizontal scanning is executed. At this time, for the image preparation section 25 to transfer black image data to the band buffer 29, the image preparation section 25 is controlled so as to print as many dots as the number of dots more than that at the previous time by the number of print dots of the black head 11 divided by the number of print divisions. For example, when the number of print divisions is two, half the print width of the black head 11 from the rear end thereof is used for printing in the first processing of step S162 and all the print width of the black head 11 is used for printing in the second processing of step S162. The horizontal scanning is executed twice, whereby 100% print is complete in the area as wide as half the print width of the black head 11 from the mode change point.

Print with the black head 11 at the same position is thus executed as many times as the number of print divisions, whereby horizontal scanning is executed in the region just below the area printed in the color mode as many times as the number of print divisions. Then, normal black mode print is executed.

Figure 15:
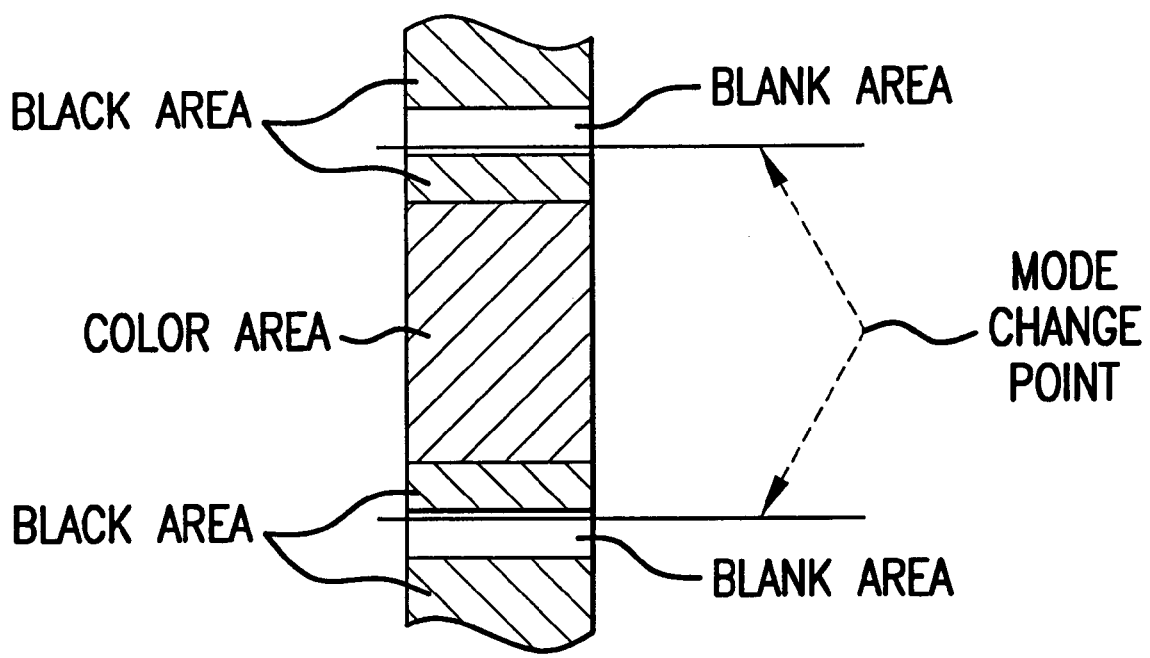
FIG. 15 is a schematic drawing of mode change points in the second example of the operation of the embodiment of the invention.

In the processing of the head position management section 24 in each print mode in the second example given above, when the print mode is changed, a search is made for a blank area and if a blank area exists, the print mode is changed in the blank area. This merit will be discussed. FIGS. 13 and 14 are illustrations of examples of color and black mix documents. FIG. 15 is a schematic drawing of mode change points in the second example of the operation of the embodiment of the invention. A part of a 2-column document is shown in FIG. 13 and "TITLE" is printed in a color other than black. For convenience of the illustration, dual characters are used to indicate that "TITLE" is colored. A colored table is inserted in the document shown in FIG. 14. For convenience of the illustration, the colored regions are hatched.

As previously described with reference to FIG. 4, when horizontal scanning is executed more than once for forming a 100% image, it is repeated while the head section is moved little by little, thereby making inconspicuous white stripes and inconsistencies in density caused by paper feed accuracy, etc., at joins of areas formed in each scanning. Thus, high-quality images can be printed in the color mode or the black mode. However, in the above-described control, at the mode change point, horizontal scanning is not executed for printing across the boundary between the area printed in the color mode and the area printed in the black mode. Thus, there is a possibility that a white stripe or inconsistencies in density will become conspicuous at the joint at the mode change point.

For example, if steps S135–S137 in the flowchart shown in FIG. 11 and steps S155–S157 in the flowchart shown in FIG. 12 are not executed as in the first example described above and the boundary between a color area containing a color image other than black and a black area is adopted as a mode change point in the same way, when color characters are used in a part of a sentence of a multi-column document, for example, as shown in FIG. 13, there is a possibility that the mode change points will become the upper and lower ends of the color text and the mode will be changed over black characters in the right column. In the colored table shown in FIG. 14, if the table is hemmed with black, the mode change point becomes just below or above the hem of the boundary between color and black and is positioned in the connection part to a longitudinal line.

When black continues to a color area as in the examples shown in FIGS. 13 and 14, if mode change control as described above is performed with the boundary between the color and black areas adopted as the mode change point as in the first example given above, horizontal scanning is not executed across both the areas, so that a white stripe or inconsistencies in density will occur.

However, in the second example, for the black area contiguous to a color area, a search is made for a blank area and if a blank area exists, the point is adopted as the mode change point. When a color area is preceded by a black area, if the black area is preceded by a blank area, for example, as shown in FIG. 15, the blank area is adopted as the mode change point. When a color area is followed by a black area, if the black area is followed by a blank area, the blank area is adopted as the mode change point. Then, the mode can be changed in blank areas as much as possible. Thus, a white stripe is not entered in a midpoint of the text part in the right column even in the document as shown in FIG. 13 and the hem and a longitudinal line are not separated by a white stripe even in the table shown in FIG. 14; documents can be well printed.

Figure 16:
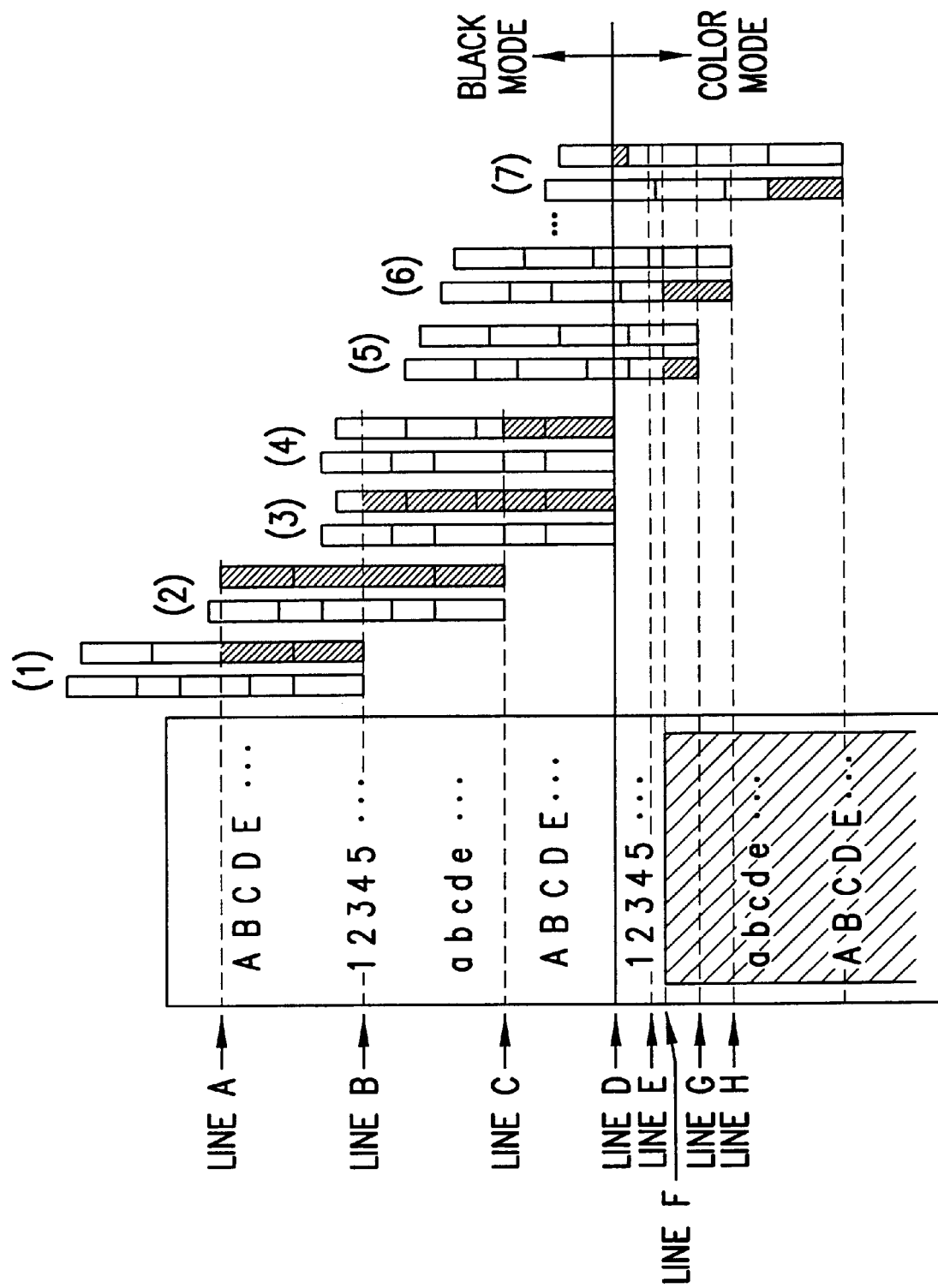
FIG. 16 is an illustration of a specific example of the second example of the operation containing change from the black mode to the color mode in the embodiment of the invention.
Figure 17:
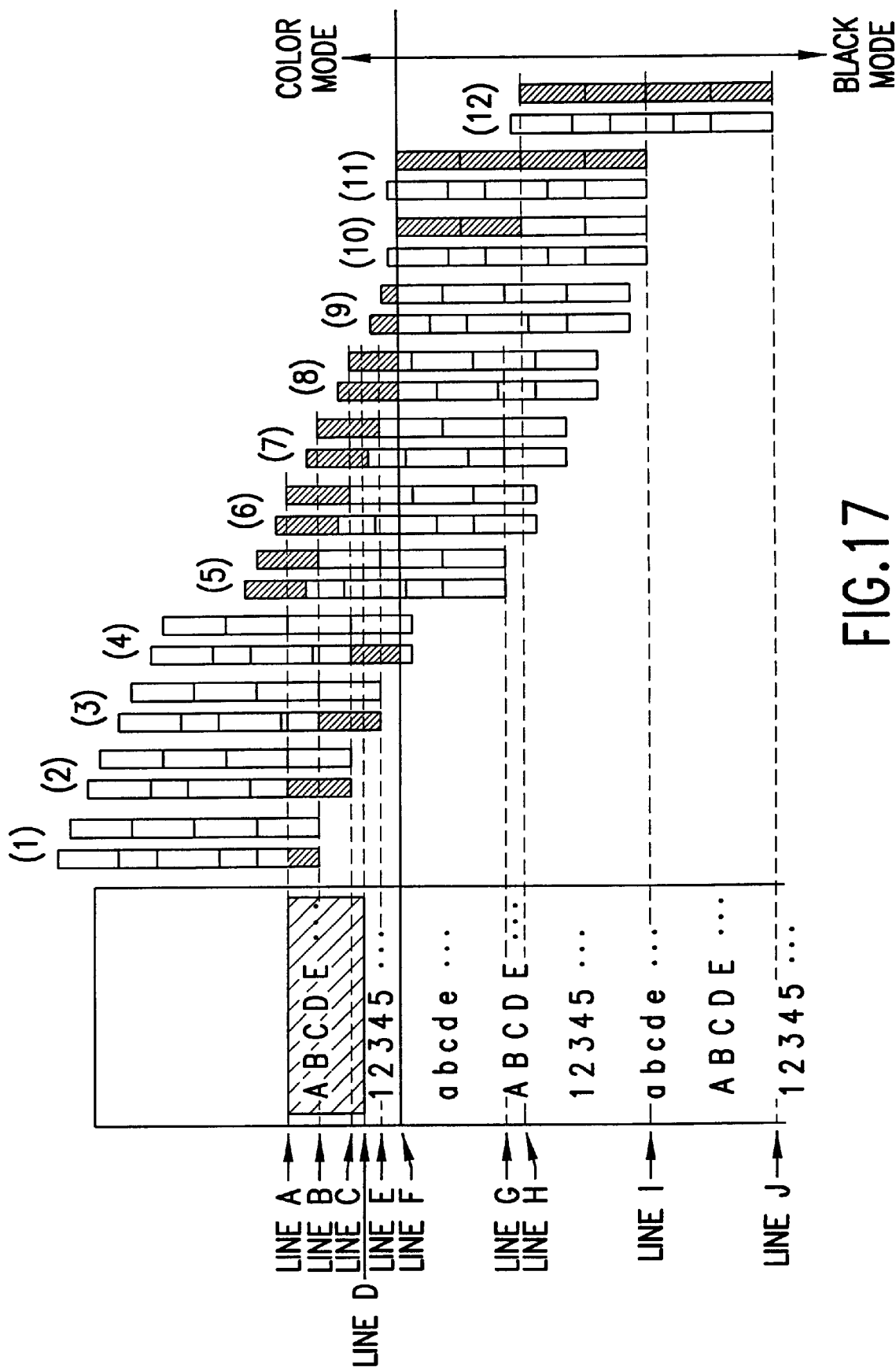
FIG. 17 is an illustration of a specific example of the second example of the operation containing change from the color mode to the black mode in the embodiment of the invention.

The second example of the operation described above will be discussed with a specific example. In the description to follow, the color head prints three colors of cyan, magenta, and yellow each with an equal number of dots. The colors are cyan, magenta, and yellow in order from the bottom to the top of the color head. The black head has as many dots as the number four times the number of dots of a single color. In the color mode, the black head prints with a quarter of the upper end of the head. Thus, in the color mode, the number of dots printed in three colors of the color head equals that printed in black. The head position indicates the lower end of the print area of the head; in the initial state, the upper end of recording paper is the current position. Further, the number of print divisions is two and the same area is printed by executing horizontal scanning twice, forming a 100% image. To make a relative move in the vertical scanning direction, recording paper is moved. In FIGS. 16 and 17, the portions of each head used for print are hatched.

FIG. 16 is an illustration of a specific example of the second example of the operation containing change from the black mode to the color mode in the embodiment of the invention. In the example shown in FIG. 16, a line of "ABCDE . . . ," a line of "12345 . . . ," and a line of "abcde . . . " are printed repeatedly in black. The hatched portion of the fifth line is printed in green by superimposing cyan and yellow. The green portion overlaps the lower part of the character string "12345 . . . . "

In the initial state, the head position is at the upper end of recording paper. Since blank exists in the upper end part of image data, the recording paper is fed over the portion and the head position is set to the upper end of the first line "ABCDE . . . ," namely, line a. In this state, the image data of each color as wide as a half of the print width of the black head is preread. Since the number of print divisions is two, a half of the print width is applied. In the example in FIG. 16, the image data between line a and the position immediately preceding line b is preread, wherein a black image exists, but color data other than black does not exist. Thus, the black mode is set. With the head position set to the position immediately preceding line a, recording paper feed is controlled and the image preparation section 25 is made to transfer the image data between line a and the position immediately preceding line b. Horizontal scanning is executed at the position in (1) in FIG. 16, thereby performing the first print of the area between line a and the position immediately preceding line b with the lower half of the black head.

After the printing at the position in (1) in the figure, the black mode still remains. Thus, further the image data of each color as wide as a half of the print width of the black head is preread. Also in this case, color data does not exist in the preread range, thus black mode print is executed. That is, with the head position set to the position immediately preceding line c, recording paper feed is controlled and the image preparation section 25 is made to transfer the image data between line a and the position immediately preceding line c. Horizontal scanning is executed at the position in (2) in the figure, whereby the whole black head is used to execute the second print of the area between line a and the position immediately preceding line b and the first print of the area between line b and the position immediately preceding line c.

Further, the image data of each color as wide as a half of the print width of the black head is preread. In this case, color data exists on line f. Thus, the line immediately preceding line f is once held as the mode change point. A search is made for a blank line from line f to the head position. In the example, the line immediately preceding line d is a blank line. Thus, the found line immediately preceding line d is set as the mode change point.

Black mode print is completed in the area to the mode change point. That is, horizontal scanning needs to be executed twice over the area between line c and the line immediately preceding line d and the second horizontal scanning needs also to be executed over the area between line b and the line immediately preceding line c. First, with the head position set to the position immediately preceding line d, recording paper feed is controlled and the image preparation section 25 is made to transfer the image data between line b and the position immediately preceding line d. Horizontal scanning is executed at the position in (3) in the figure, thereby executing the second print of the area between line b and the position immediately preceding line c and the first print of the area between line c and the position immediately preceding line d. At this time, the whole print width of the black head is not used; only the part of the black head corresponding to the width between line b and the position immediately preceding line d is used.

In this state, the second print of the area between line c and the position immediately preceding line d is not yet executed. Thus, the head position management section 24 does not change the head position and again executes horizontal scanning at the same position, as shown in (4) in the figure. At this time, it instructs the image preparation section 25 to transfer only the image data between line c and the position immediately preceding line d. Thus, the black head portion used for the printing becomes the portion corresponding to the width of line c to the position immediately preceding line d. Such horizontal scanning at the same position is executed as many times as the number of print divisions; since the number of print divisions is two, the horizontal scanning is executed twice in (3) and (4) in the figure. After the horizontal scanning at the same position is executed as many times as the number of print divisions, change is made to the color mode.

Line d and later lines are printed in the color mode. The area between lines d and f contains only black data, but is also printed in the color mode. In the color mode, first the image data as wide as a half of the print width of a single color in the color head is preread. Here, the image data between line d and the position immediately preceding line e is preread. Since the image data does not contain color data, the image data of each color as wide as the print width of the black head is preread. Since the image data contains color data on and after line f, the normal color mode print is executed.

At this time, if the head position is placed immediately preceding line e, the data to be printed does not exist. When the head position is at line e, the area between line d and the position immediately preceding line e can be printed only with the cyan part of the color head. However, the area does not contain cyan data. Although black print data exists in the area between line d and the position immediately preceding line e, no print is executed at the position because the rear end quarter of the black head is used to print in black in the black mode in the example. Thus, if the head position is placed immediately preceding line e, the data to be printed does not exist and white skip operation is performed.

Further, if image data is preread with the head position placed immediately preceding line e, color data exists on line f, thus the color mode is continued. At this position, as on lines d to e, the data to be printed does not exist in the area to the position immediately preceding line f, so that white skip operation can be performed in the area to the line immediately preceding line f. Thus, the line immediately preceding line g ahead of line f by a half of the print width of cyan is determined to be the head position and the recording paper is fed from the line immediately preceding line d to the line immediately preceding line g. Such white skip operation is performed, thereby executing print at high speed. The image preparation section 25 is made to transfer the cyan image data existing between line f and the position immediately preceding line g. At this time, for other color parts of the color head and the black head, the head portion used for printing precedes the mode change point, thus image data transfer is not executed. Horizontal scanning is executed at the position in (5) in the figure, thereby executing the first cyan print in the area between line f and the position immediately preceding line g with a half of the cyan part of the color head.

Next, the image data as wide as a half of the print width of a single color in the color head from line g to the line immediately preceding line h is preread. Since this area also contains color data, the head position is placed at the line immediately preceding line h and recording paper control is performed. The image preparation section 25 is made to transfer the image data between line f and the position immediately preceding line h. Horizontal scanning is executed at the position in (6) in the figure, thereby executing the second print of the area between line f and the position immediately preceding line g and the first print of the area between line g and the position immediately preceding line h with the whole print width of the cyan part of the color head.

Likewise, the sequence of prereading the image data as wide as a half of the print width of a single color in the color head, feeding the recording paper a half of the print width of a single color, and executing the horizontal scanning is repeated. When the area following line d is contained in the upper quarter of the black head ((7) in the figure), the area between line d with black only and line f is also printed in sequence. When the area following line f is contained in the yellow print area of the color head, yellow is recorded on previously printed cyan to produce green.

In the example, the blank line immediately preceding line d is adopted as the mode change point for changing the mode. The image of line d just after change is made to the color mode is not printed until the head position in (7) in the figure, and the recording paper is fed several times, thus a recording paper feed error, etc., easily occurs and missing white easily occurs. Since horizontal scanning across the mode change point is not executed, missing white cannot be corrected. However, since the mode change point is set on a blank line, no problem occurs if missing white occurs. Thus, high-quality print images can be provide.

FIG. 17 is an illustration of a specific example of the second example of the operation containing change from the color mode to the black mode in the embodiment of the invention. In the example shown in FIG. 17, lines of "ABCDE . . . ," "12345 . . . ," and "abcde . . . " are printed repeatedly in black as in the example in FIG. 16. The hatched portion of the first line to the upper part of the second line is printed in green by superimposing cyan and yellow.

In the example shown in FIG. 17, line a is the top of an image. The head position is placed immediately preceding line a and the image data of each color of the area as wide as a half of the print width of a single color is preread. That is, the image data of the area between line a and the position immediately preceding line b is preread. It contains color data. Thus, color mode print is executed. The head position is set to the line immediately preceding line b and recording paper feed is controlled. The image preparation section 25 is made to transfer the cyan image data existing between line a and the position immediately preceding line b. Horizontal scanning is executed at the position in (1) in the figure for executing the first print of the area between line a and the position immediately preceding line b with the lower half of the cyan print width of the color head.

Further, the image data of each color as wide as a half of the print width of a single color of the color head is preread. Also in this case, color data exists in the preread range, thus color mode print is executed. That is, the head position is set to the line immediately preceding line c and recording paper feed is controlled. The image preparation section 25 is made to transfer the cyan image data existing between line a and the position immediately preceding line c. Horizontal scanning is executed at the position in (2) in the figure, whereby the whole cyan print width of the color head is used to execute the second cyan print of the area between line a and the position immediately preceding line b and the first cyan print of the area between line b and the position immediately preceding line c.

Likewise, the image data of each color as wide as a half of the print width of a single color is preread. In this case, color data is out on line d. However, the preread image data contains color data, thus the color mode print is continued. The head position is set to the line immediately preceding line e and recording paper feed is controlled. The image preparation section 25 is made to transfer the cyan image data existing between line b and the position immediately preceding line e. Horizontal scanning is executed at the position in (3) in the figure for executing the second cyan print of the area between line b and the position immediately preceding line c and the first cyan print of the area between line c and the position immediately preceding line e.

Further, the image data of each color as wide as a half of the print width of a single color is preread. At this time, color data does not exist in the preread range. Thus, the image data of each color as wide as the print width of the black head is preread, but does not contain color data either. In such a case, the print mode is changed from the color mode to the black mode. To change from the color mode to the black mode, first the line immediately preceding line e of the head position is held as the mode change point and a search is made for a blank line. Line f contains a blank line. Thus, the line immediately preceding line f is again set as the mode change point. Print of the area to the mode change point is terminated. Then, initial print in the black mode is executed and a transition is made to the normal black mode operation.

The color mode area print before line f is terminated. In this processing, when the image preparation section 25 transfers the image data, it is controlled so as not to transfer the image data following line f and other data is printed as in the normal color mode. That is, horizontal scanning is executed at the positions in (4)–(9) in the figure for recording the area printed in the color mode.

At the position in (4) in the figure, the second cyan print of the area between line c and the position immediately preceding line e is executed. Image data of colors to be printed does not exist between the positions in (4) and (5) in the figure. Thus, the head position is set to the line immediately preceding line g and recording paper is fed at a time. Such white skip operation is performed for high-speed printing. The image preparation section 25 is made to transfer the black image data existing between line a and the position immediately preceding line c and the yellow image data existing between line a and the lower end position of yellow. Horizontal scanning is executed at the position in (5) in the figure for executing the first black print of the area between line a and the position immediately preceding line b and the first yellow print of the area between line a and the lower end of yellow with the upper quarter of the black head and the yellow part of the color head. In this case, yellow is superimposed on previously printed cyan to produce green.

Likewise, at positions (6)–(9) in the figure, print is executed in yellow and black and horizontal scanning is executed twice for each color over the area to the position immediately preceding line f, forming an image. At this time, the area between line d and the position immediately preceding line f is a black print area, but a black area adjoining a color area, thus the region to line f of a blank line is printed in the color mode.

After the horizontal scanning at the position in (9) in the figure, the head position is placed at the line immediately preceding line i so that the rear end of the head becomes line f, then recording paper feed is controlled and the initial operation in the black mode is performed. First, the image preparation section 25 is made to transfer the image data between line f and the position immediately preceding line h ahead of line f by a half of the print width of the black head, and horizontal scanning is performed at the position in (10) in the figure, thereby executing the first print of the area between line f and the position immediately preceding line h with only the upper half of the black head.

If the head position is moved to the line immediately preceding line j ahead by a half of the print width of the black head as in the state, the area between line f and the position immediately preceding line h is printed only once. Thus, the head position is not moved and the image preparation section 25 is made to transfer the image data between line f and the position immediately preceding line i. Horizontal scanning is executed at the position in (11) in the figure for executing the second print of the area between line f and the position immediately preceding line h and the first print of the area between line h and the position immediately preceding line i with the whole black head. After this, normal black mode print, namely, a sequence of prereading the area as wide as a half of the print width of the black head, feeding the recording paper, and executing the horizontal scanning for printing will be executed.

Since the print mode is thus changed from the black mode to the color mode or from the color mode to the black mode in a blank area, the adverse effect of white stripes, inconsistencies in density, etc., easily occurring at the print mode change time is avoided and image quality degradation caused by changing the print mode is suppressed, so that a good image can be provided. A blank area is not indispensable at the print mode change time; if a blank area does not necessarily exist, the print mode can be changed. At this time, print incapability does not cause the density to lower.

In the color mode and the black mode, while the head position is shifted, the horizontal scanning is executed more than once for performing 100% printing. Thus, misalignment of joints of areas formed in each scanning caused by a recording paper feed error and dot position misalignment caused by directivity variations in nozzles can be made inconspicuous and adjacent dots printed at the same time can be decreased for lessening bleeding for improving the image quality. The black area is printed in the black mode making full use of the wide print width of the black head, thus can be printed at high speed. For example, as shown in FIGS. 16 and 17, in the color mode, print is executed every width of dividing the print width of a single color by the number of print divisions; in the black mode, print is can be executed every width of dividing the print width of the black head wider than that of a single color by the number of print divisions.

In the specific example, black data is printed in the color mode with the upper quarter of the black head, but any part of the black head may be used. Although the number of print divisions is two in the specific example, similar control is enabled for any number of print divisions. When the mode is changed, horizontal scanning may be repeated at the same position as many times as the number of divisions.

Figure 18A:
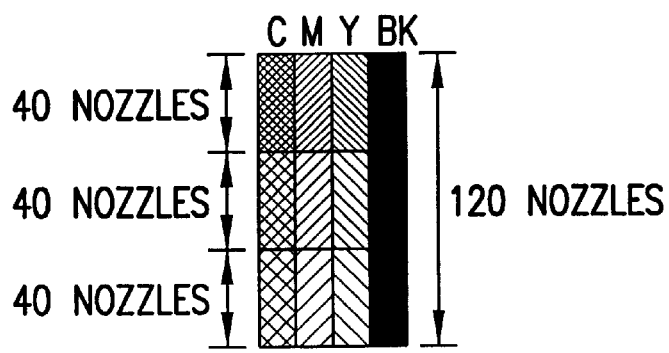
FIGS. 18A–B are schematic drawings to show other examples of a recording head section.
Figure 18B:
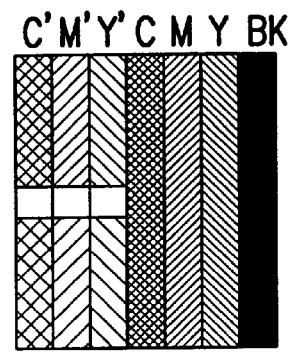

The first and second examples of the operation are not limited to the head configuration, for example, shown in FIG. 3. FIGS. 18A–B is a schematic drawing to show other examples of a recording head section. The recording head section shown in FIG. 18A comprises one black head and three color heads. The color heads are provided for forming images in different colors. In the example, each color head is divided into three parts and an image can be formed in three types of inks which are dark, medium, and pale. An image is thus formed in inks different in density, whereby a multi-tone image such as a photo can be formed with high image quality.

The recording head section shown in FIG. 18B comprises one black head and six color heads. Three of the color heads are provided for forming images in dark inks and each has a print width equal to that of the black head. The remaining three color heads are each divided into two parts for forming images in medium and pale inks. With the recording head section, color images with emphasis not much placed on gradation, such as color characters, are recorded with the three color heads having dark inks and the black head, whereby images can be formed at high speed with a wide print width. A multi-tone image such as a photo is recorded with all heads or the black head and the three color heads with medium and pale inks, whereby a high-quality image can be formed.

A specific example of the operation at the mode change time for recording with the recording head section shown in FIG. 18A will be discussed. For simplicity, a description will be given in conformance with the first example of the operation described above. As in the first example, a blank area may be detected and the mode change point may be again set. Various modifications on the operation in the first and second examples can also be made.

Figure 19:
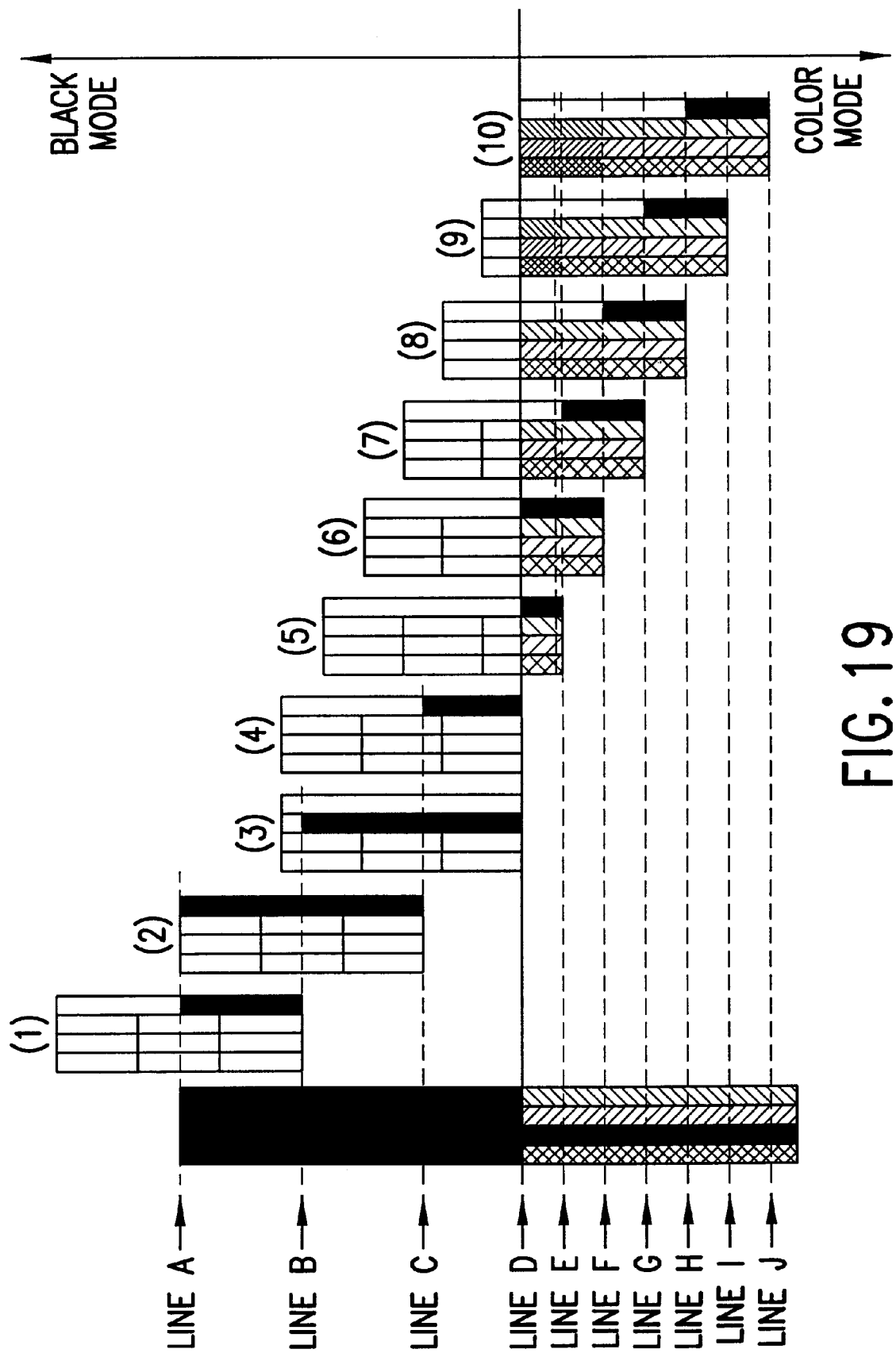
FIG. 19 is an illustration of a specific example of the third example of the operation at the change time from the black mode to the color mode in the embodiment of the invention.

FIG. 19 is an illustration of a specific example of the third example of the operation at the change time from the black mode to the color mode in the embodiment of the invention. In the description to follow, the color heads are cyan, magenta, and yellow color heads and each color head prints in pale, medium, and dark inks from the bottom to the top in FIG. 18. The black head has a print width three times as wide as each of pale, medium, and dark print widths. The current position of the head indicates the lower end of the print area of the head; in the initial state, the upper end of recording paper is the current position. Further, the number of print divisions is two and the same area is printed by executing horizontal scanning twice, forming a 100% image. To make a relative move in the vertical scanning direction, recording paper is moved.

In the example shown in FIG. 19, an image consisting of a solid black portion and a color bar portion like longitudinal stripes is printed. For convenience of illustration, the colors are indicated in different hatching manners and different hatched spacings are adopted for representing different densities. Only the portions of each head used for print are hatched.

In the initial state, the lower end of the head is aligned with the upper end of recording paper. Since blank exists in the upper end part of image data, the recording paper is fed over the portion and the current position of the recording head is set to the upper end of the solid black portion, namely, line a. In this state, the image data of each color as wide as a half of the print width of the black head is preread. Since the number of print divisions is two, a half of the print width is applied. In the example in FIG. 19, the image data between line a and the position immediately preceding line b is preread, wherein a black image exists, but color data other than black does not exist. Thus, black mode print is executed. The recording paper is fed to the position immediately preceding line b and horizontal scanning is executed at the position in (1) in FIG. 8 for performing the first print of the area between line a and the position immediately preceding line b with the lower half of the black head.

After the printing in (1) in the figure, the black mode still remains. Thus, further the image data of each color as wide as a half of the print width of the black head is preread. Also in this case, color data does not exist in the preread range, thus black mode print is executed. That is, the recording paper is fed to the position immediately preceding line c and at the position in (2) in the figure, the whole black head is used to execute horizontal scanning, whereby the second print of the area between line a and the position immediately preceding line b and the first print of the area between line b and the position immediately preceding line c are executed.

Further, the image data of each color as wide as a half of the print width of the black head is preread. In this case, color data exists on line d. Thus, in the subsequent print processing, change is made to the color mode. First, the area between line c and the position immediately preceding line d containing only black data is printed in the black mode. Also, the second print of the area between line b and the position immediately preceding line c needs to be executed. First, the recording paper is fed to the position immediately preceding line d and at the position in (3) in the figure, the black head is used to execute horizontal scanning (the black head portion used for the printing is the portion corresponding to the width of line b to the position immediately preceding line d), whereby the second print of the area between line b and the position immediately preceding line c and the first print of the area between line c and the position immediately preceding line d are executed.

In this state, the second print of the area between line c and the position immediately preceding line d is not yet executed. Thus, the recording paper is not fed and horizontal scanning is again executed at the same position, as shown in (4) in the figure. At this time, the black head portion used for the printing is the portion corresponding to the width of line c to the position immediately preceding line d and is reduced as compared with the head portion used in (3) in the figure. Such horizontal scanning at the same position is executed as many times as the number of print divisions; since the number of print divisions is two, the horizontal scanning is executed twice in (3) and (4) in the figure. After the horizontal scanning at the same position is executed as many times as the number of print divisions, change is made to the color mode.

In the color mode, first the image data as wide as a half of the print width of a single density in the color heads is preread. Here, the image data between line d and the position immediately preceding line e is preread. Since this area contains color data of each color, color mode print is executed as in the state. First, the recording paper is fed a half of the print width of a single density and horizontal scanning is executed at the position in (5) in the figure for performing the first print of the area between line d and the line immediately preceding line e in pale ink of each color of the color heads.

Next, the image data as wide as a half of the print width of a single density in the color heads from line e to the line immediately preceding line f is preread. Since this area also contains color data, the recording paper is fed a half of the print width of a single density and horizontal scanning is executed at the position in (6) in the figure, thereby performing the second print of the area between line d and the line immediately preceding line e in pale ink and the first print of the area between line e and the line immediately preceding line f in pale ink.

Next, the image data as wide as a half of the print width of a single density in the color heads from line f to the line immediately preceding line g is preread. Since this area also contains color data, the recording paper is fed a half of the print width of a single density and horizontal scanning is executed at the position in (7) in the figure, thereby performing the second print of the area between line e and the line immediately preceding line f in pale ink and the first print of the area between line f and the line immediately preceding line g in pale ink. Also, the first print of the area between line d and the line immediately preceding line e is performed in medium-density ink.

Likewise, the sequence of prereading the image data as wide as a half of the print width of a single density in the color head, feeding the recording paper a half of the print width of a single density, and executing the horizontal scanning is repeated. In the example in FIG. 19, black print in the color mode is executed with the first one third the black head; of course, the middle or rear one third the black head may be used for printing.

Figure 20:
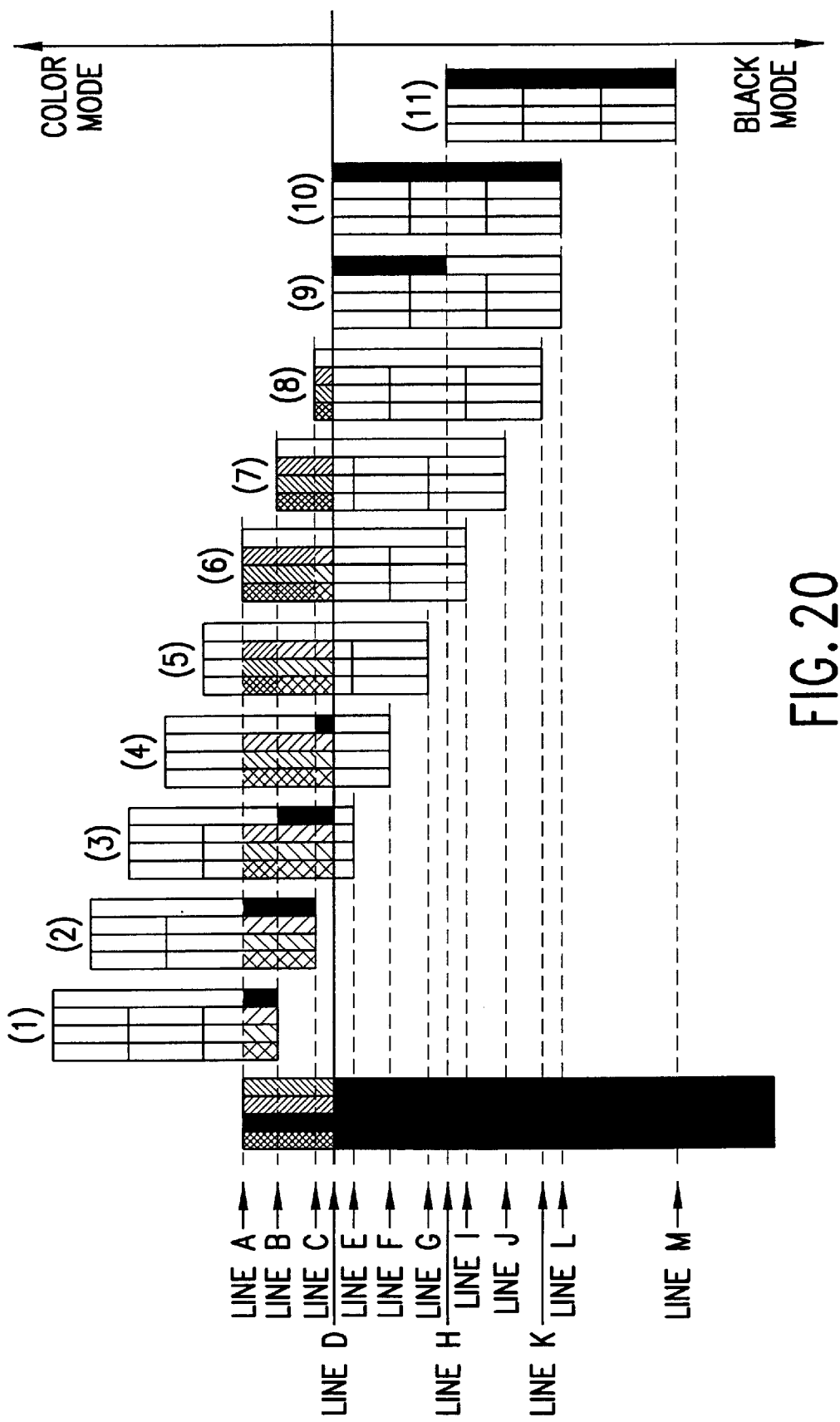
FIG. 20 is an illustration of a specific example of the third example of the operation at the change time from the color mode to the black mode in the embodiment of the invention.

FIG. 20 is an illustration of a specific example of the third example of the operation at the change time from the color mode to the black mode in the embodiment of the invention. The prerequisites in the description to follow are similar to those previously described with reference to FIG. 19. In the color mode, the top one third the black head (lower end in the figure) is used for printing. In the example shown in FIG. 20, an image consisting of a color bar portion like longitudinal stripes and a solid black portion is printed. The colors are indicated in different hatching manners and different hatched spacings are adopted for representing different densities.

In the example shown in FIG. 20, line a is the top of an image and recording paper is fed to this position at the beginning. The image data of each color of the area as wide as a half of the print width of a single density is preread. That is, the image data of the area between line a and the position immediately preceding line b is preread. It contains color data. Thus, color mode print is executed. The recording paper is fed to the position immediately preceding line b and horizontal scanning is executed at the position in (1) in the figure for executing the first print of the area between line a and the position immediately preceding line b with the lower half of the print width of pale ink of each color of the color head.

Further, the image data of each color as wide as a half of the print width of a single density of the color head is preread. Also in this case, color data exists in the preread range, thus color mode print is executed. That is, the recording paper is fed to the position immediately preceding line c and horizontal scanning is executed at the position in (2) in the figure with the cyan print width of the color head, whereby the second print of the area between line a and the position immediately preceding line b is executed in pale ink and the first print of the area between line b and the position immediately preceding line c is executed in pale ink.

Further, the image data of each color as wide as a half of the print width of a single density is preread. In this case, color data is out on line d. However, the preread image data contains color data, thus the color mode print is continued. The recording paper is fed to the position immediately preceding line e and at the position in (3) in the figure, the second print of the area between line b and the position immediately preceding line c is executed in pale ink and the first print of the area between line c and the position immediately preceding line d is executed in pale ink. The first print of the area between line a and the position immediately preceding line b is executed in medium-density ink.

Further, the image data of each color as wide as a half of the print width of a single density is preread. At this time, color data does not exist in the preread range. Thus, the image data of each color as wide as the print width of the black head is preread, but does not contain color data either. In such a case, the print mode is changed from the color mode to the black mode with line d as the mode change point. To change the print mode from the color mode to the black mode, first print of the color mode area to the position immediately preceding line d is terminated. Then, initial print in the black mode is executed and a transition is made to the normal black mode operation.

The color mode area print before line d is terminated. In this processing, the image data following line d is masked to skip printing and the preceding image data is printed as in the normal color mode. That is, from the position in (3) in the figure, the recording paper is fed by a half of the record width of a single density and at the position in (4) in the figure, the second print of the area between line c and the position immediately preceding line d is executed in pale ink. Also, the second print of the area between line b and the position immediately preceding line c is executed in medium-density ink and the first print of the area between line a and the position immediately preceding line b is executed in medium-density ink.

Likewise, at positions (5)–(8) in the figure, print is executed in medium-density ink and in dark ink and horizontal scanning is executed each twice over the area to the position immediately preceding line d, forming an image.

After the horizontal scanning at the position in (8) in the figure, the recording paper is fed so that the rear end of the black head (upper end in the figure) becomes line d, resulting in the position in (9) in the figure. This position is the mode change point. By the operation performed so far, the color mode area print is complete. Then, the color mode is changed to the black mode. However, if horizontal scanning and the recording paper feed operation are performed as in the state, the area between line d and the position immediately preceding line h is printed only once. Thus, the first black print of the area between line d and the position immediately preceding line h is executed at the position in (9) in the figure and at the position in (10) in the figure which is the same as the position in (9), the second print of the area between line d and the position immediately preceding line h and the first print of the area between line h and the position immediately preceding line 1 are executed. After this, normal black mode print, namely, a sequence of prereading the area as wide as a half of the print width of the black head, feeding the recording paper, and executing the horizontal scanning for printing will be executed.

Thus, in the recording head configuration as shown in FIG. 18A, good mode change processing can also be performed under control similar to that in the first example. As in the second example described above, when a mode change point is detected, a blank area is detected and the mode change point can also be changed to the blank area, whereby occurrence of white stripes, etc., at the mode change time can be prevented as in the second example.

The recording head section shown in FIG. 18B can also be used in a similar manner to that described above. To use the recording head section shown in FIG. 18B, the color heads each having a wide print width with dark ink can be used for printing in a color character mode, so that print can be executed under print control similar to that in the black mode described above. Since the split color heads for jetting pale ink and medium-density ink are used in a color photo mode for printing a photo, etc., print control is performed with a narrow print width similar to that in the color mode described above. Thus, similar control to the change control between the black mode and the color mode described above may be performed between the black mode or the color character mode and the color photo mode.

As many apparently widely different embodiments of the invention may be made without departing from the spirit and scope thereof, it is understood that the invention is not limited to the embodiment containing the first to third examples.

As seen from the description made so far, according to the invention, split print is executed for forming an image in any print mode, whereby the print quality of the whole image can be enhanced. When the print mode is changed, a blank area is not indispensable in the vicinity of the print mode change line, thus print images are not limited and degradation of the image quality caused by changing the print mode can also be suppressed. Further, if a blank area exists in the vicinity of the mode change point at the print mode change time, the mode change point is changed to the blank area and the print mode is changed, whereby white stripes and inconsistencies in density occurring at the mode change point can be avoided and efficient print can be executed with good image quality maintained.

What is claimed is:

1. An image formation method of a serial printer comprising:

a plurality of print heads placed in a horizontal scanning direction, each head having a plurality of print elements arranged on a carriage in a vertical scanning direction that are driven based on lines of image data read from an image memory, the heads also executing horizontal scanning over a single area a number of times corresponding to a selected number of print divisions so as to form an image, said method comprising the steps of:

selecting a print mode from among a plurality of print modes different in print width to form an image by horizontal scanning, reading in advance of printing at least a predetermined number of lines of image data, the predetermined number corresponding to at least the number of lines of image data per print width in the selected print mode divided by the number of print divisions, setting a mode change point in a predetermined line in the read image data if the read image data contains pixels to be printed in a different print mode completing the image to the mode change point if change is made from a selected print mode with a wide print width to a different print mode with a narrow print width by repeating printing a number of times corresponding to the number of print divisions at a same position in the vertical scanning direction while the print width is reduced, and changing the print mode to the different print mode for continued printing after the mode change point.

2. The image formation method of claim 1, wherein said plurality of heads are a black head and one or more color heads having a black mode with a wide print width and a color mode with a narrow print width;

said method comprising the steps of:

reading in advance of printing at least a predetermined number of lines of image data, the predetermined number corresponding to at least the number of lines of image data per print width in the black mode divided by the number of print divisions in the black mode, setting a mode change point, if the read image data contains color pixels, to a line ahead of a line containing a first color pixel in the read image data, completing the image to the mode change point in the black mode by repeating printing a number of times corresponding to the number of print divisions at the same position in the vertical scanning direction while the print width is reduced, and changing the black mode to the color mode for continued printing after the mode change point.

3. The image formation method of claim 2, wherein a line immediately preceding the line containing the first color pixel in the read image data is set as the mode change point.

4. The image formation method of claim 2, wherein if a blank area preceding the line containing the first color pixel in the read image data is detected, the mode change point is set in the blank area.

5. An image formation method of a serial printer comprising:

a plurality of heads placed in a horizontal scanning direction, each head having a plurality of print elements arranged on a carriage in a vertical scanning direction that are driven based on lines of image data read from an image memory, the heads also executing horizontal scanning over a single area a number of times corresponding to a selected number of print divisions so as to form an image, said method comprising the steps of:

selecting a print mode from among a plurality of print modes different in print width to form an image by horizontal scanning, reading in advance of printing at least a predetermined number of lines of image data, the predetermined number corresponding to at least the number of lines of image data per print width in the selected print mode divided by the number of print divisions, setting a mode change point in a predetermined line in the read image data if the read image data contains pixels to be printed in a different print mode completing the image to the mode change point if change is made from a selected print mode with a narrow print width to a different print mode with a wide print width, repeating printing a number of times corresponding to the number of print divisions at a same position in the vertical scanning direction while the print width is increased, and continued printing in the different print mode with the wide print path.

6. The image formation method of claim 5, wherein said plurality of heads are a black head and one or more color heads having a black mode with a wide print width and a color mode with a narrow print width, said method comprising the steps of:

reading in advance of printing at least a predetermined number of lines of image data, the predetermined number corresponding to at least the number of lines of image data per print width in the color mode divided by a number of print divisions in the color mode, if the read image data does not contain any color pixels, setting a mode change point following a line immediately preceding the read image data, and completing the image to the mode change point in the color mode, repeating printing after the mode change point a number of times corresponding to a number of print divisions in the black mode at the same position in the vertical scanning direction while the print width is increased, continuing printing in the black mode.

7. The image formation method of claim 6, wherein if the read image data does not contain any color pixels, a line immediately preceding the read image data is set as the mode change point.

8. The image formation method of claim 6, comprising the steps of:

reading in advance of printing a number of lines of image data corresponding to the number of lines of image data per print width in the color mode divided by the number of print divisions in the color mode, if the read image data does not contain any color pixels, reading in advance of printing image data corresponding to the number of lines of image data per print width in the black mode divided by the number of print divisions, and if the read image data does not contain any color pixels, setting a line following the line immediately preceding the read image data as the mode change point.

9. The image formation method of claim 6, wherein:

if the read image data does not contain a color image and a blank area of the read image data range is detected, the mode change point is set in the blank area.

10. An image formation control system for controlling image formation of a serial printer, comprising:

a plurality of heads placed in a horizontal scanning direction, each head having a plurality of print elements arranged on a carriage in a vertical scanning direction that are driven based on lines of image data read from an image memory, the plurality of heads having multiple selectable print widths each corresponding to a certain number of lines of image data, the plurality of heads also executing horizontal scanning over a single area a number of times corresponding to a selected number of print divisions so as to form an image, said system comprising:
  head position management means for managing a position and the print width of the heads to form an image in response to a selected print mode, said head position management means controlling the serial printer so as to read in advance of printing at least a predetermined number of lines of image data, the predetermined number corresponding to at least the number of lines of image data per print width in the selected print mode divided by the number of print divisions, and
  image transfer means for transferring an image to the heads in accordance with the head position and print width determined by said head position management means,
  mode change setting means for setting a mode change point at a predetermined line in the read image data if the read image data contains data that requires printing in a different mode other than the selected mode, and
  mode completion means for completing the printing of the image to the mode change point in the currently selected print mode by repeating printing a number of times corresponding to the number of print divisions while the print heads remain in a same position in the vertical scanning direction and the print width is reduced to print only to the mode change point when the selected print mode has a wide print width and the different mode has a narrow print width, and
  mode change means for changing the print mode to the different print mode for printing after the mode change point at the print width of the different print mode.

11. The image formation control system of claim 10, wherein
  said plurality of heads include a black head and at least one color head, and wherein
  said head position management means is operating in a black mode having a wide print width and is changeable to a color mode having a narrow print width and controls the serial printer so that the predetermined number of lines of image data read in advance of printing corresponds to the number of lines per print width in the black mode divided by the number of print divisions in the black mode,
  if the read image data contains color pixels, said mode change setting means sets a mode change point to a line ahead of a line containing a first color pixel in the read image data, and the mode completion means completes the image to the mode change point in the black mode by repeating printing a number of times corresponding to the number of print divisions while the print heads remain in a same position in the vertical scanning direction and the print width is reduced, and
  said mode change means for changing the print mode to the different print mode changes from the black mode to the color mode for printing after the mode change point.

12. The image formation control system of claim 11, wherein
  if the read image data contains color pixels, said head position management means sets a line immediately preceding the line containing the first color pixel in the read image data as the mode change point.

13. The image formation control system of claim 11, wherein
  if said head position management means detects a blank area preceding the line containing the first color pixel in the read image data range, said head position management means sets the mode change point to a line in the blank area.

14. An image formation control system for controlling image formation of a serial printer comprising:
  a plurality of heads placed in a horizontal scanning direction, each head having a plurality of print elements arranged on a carriage in a vertical scanning direction that are driven based on lines of image data read from an image memory, the plurality of heads having multiple selectable print widths each corresponding to a certain number of lines of image data, the plurality of heads also executing horizontal scanning over a single areas a number of times corresponding to a selected number of print divisions so as to form an image,
  said system comprising:
    head position management means for managing a position and print width of the heads to form an image in response to a selected print mode and image transfer means for transferring an image to the head in accordance with the head position and print width determined by said head position management means, said head position management means controlling the serial printer so as to read in advance of printing at least a predetermined number of lines of image data, the predetermined number corresponding to at least the number of lines of image data per print width in the selected print mode divided by the number of print divisions, and
    mode change setting means for setting a mode change point at a predetermined line in the read image data if the read image data contains data that requires printing in a different mode other than the selected mode, wherein
      if the selected print mode has a narrow print width and the different print mode has a wide print width, the head position management means completes the image to the mode change point,
      printing is repeated a number of times corresponding to the number of print divisions at the same position in the vertical scanning direction while the print width is increased, and
      printing continues in the print mode with a wide print width.

15. The image formation control system of claim 14, wherein
  said plurality of heads include a black head and at least one color head, and wherein
  said head position management means is in a color mode having a narrow print width and is changeable to a black mode having a wide print width and controls the serial printer so that the predetermined number of lines of image data read in advance of printing corresponds to the number of lines per print width in the color mode divided by the number of print divisions in the color mode,
  if the read image data does not contain any color pixels, said mode change setting means sets a mode change point to a line immediately preceding the read image data, and said mode completion means completes the image to the mode change point in the color mode,
  then, said head position management means changes to the black mode and printing of the image immediately after the mode change point is performed at a same position in the vertical scanning direction a number of times corresponding to the number of print divisions while the print width is increased from the print width of the color mode to the print width of the black mode, then, printing continues for lines after the mode change point in the black mode with the print width of the black mode being used.

16. The image formation control system of claim 15, wherein if the read image data does not contain any color pixels, said head position management means sets a line immediately preceding the read image data as the mode change point.

17. The image formation control system of claim 15, wherein said head position management means reads in advance of printing image data a number of lines of image data corresponding to the number of lines of image data per print width in the color mode divided by the number of print divisions in the color mode, if the read image data does not contain any color pixels, reads in advance of printing a number of lines of image data corresponding to the number of lines of image data per print width in the black mode divided by the number of print divisions, and if the read image data does not contain any color pixels, sets a line following the line immediately preceding the read image data as the mode change point.

18. The image formation control system of claim 15, wherein if the read image data does not contain a color image and said head position management means detects a blank area of the read image data range, the mode change point is set in the blank area.

* * * * *